US012667783B2

(12) United States Patent
Hiramuki

(10) Patent No.: US 12,667,783 B2
(45) Date of Patent: *Jun. 30, 2026

(54) STORAGE MEDIUM STORING INFORMATION PROCESSING PROGRAM, INFORMATION PROCESSING APPARATUS, INFORMATION PROCESSING SYSTEM, AND INFORMATION PROCESSING METHOD

(71) Applicant: Nintendo Co., Ltd., Kyoto (JP)

(72) Inventor: Yutaka Hiramuki, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 577 days.

This patent is subject to a terminal disclaimer.

(21) Appl. No.: 18/117,914

(22) Filed: Mar. 6, 2023

(65) Prior Publication Data

US 2023/0302358 A1 Sep. 28, 2023

(30) Foreign Application Priority Data

Mar. 25, 2022 (JP) ................................. 2022-050293
Mar. 25, 2022 (JP) ................................. 2022-050294

(51) Int. Cl.
*A63F 13/40* (2014.01)
*A63F 13/525* (2014.01)
(Continued)

(52) U.S. Cl.
CPC .......... *A63F 13/5258* (2014.09); *A63F 13/40* (2014.09); *A63F 13/525* (2014.09); *G06F 3/013* (2013.01); *G06T 5/70* (2024.01)

(58) Field of Classification Search
CPC .... A63F 13/40; A63F 13/525; A63F 13/5258; A63F 2300/6653; A63F 2300/6684; A63F 2300/6692
See application file for complete search history.

(56) References Cited

U.S. PATENT DOCUMENTS 11,922,602 B2 3/2024 Taylor
2002/0003537 A1* 1/2002 Higashiyama ........ G06T 15/005
345/422
(Continued)

FOREIGN PATENT DOCUMENTS

CN 101204083 A * 6/2008 ........... H04N 25/615
JP H09204542 A * 8/1997
(Continued)

OTHER PUBLICATIONS

"Unreal Engine 4 Documentation", [online], Epic Games, Inc., [searched on Feb. 14, 2022], internet (URL : https://docs.unrealengine.com/4.27/en-US/RenderingAndGraphics/PostProcessEffects/DepthOfField/MobileDOFMethods/), 6 pages.
(Continued)

*Primary Examiner* — Steven J Hylinski
(74) *Attorney, Agent, or Firm* — Nixon & Vanderhye PC

(57) ABSTRACT

A blurred image is generated by blurring an image of a virtual space in a range of view from a virtual camera with a degree of blurring depending on a distance from the virtual camera. The blurred image is generated with the degree of blurring additionally depending on an imaging direction of the virtual camera. The blurred image is output on a display screen.

20 Claims, 27 Drawing Sheets

(51) Int. Cl.
    *A63F 13/5258*       (2014.01)
    *G06F 3/01*          (2006.01)
    *G06T 5/70*          (2024.01)

(56)            References Cited

U.S. PATENT DOCUMENTS

| | | |
|---|---|---|
| 2004/0166933 A1 | 8/2004 | Sakagami et al. |
| 2007/0082742 A1 | 4/2007 | Takizawa et al. |
| 2014/0354631 A1 | 12/2014 | Yamaoka |
| 2019/0220089 A1 | 7/2019 | Kakizawa et al. |
| 2021/0362056 A1 * | 11/2021 | Zhou .................... A63F 13/525 |

FOREIGN PATENT DOCUMENTS

| | | | | |
|---|---|---|---|---|
| JP | 2001175884 A | * | 6/2001 | ........... H04N 13/128 |
| JP | 2002-269582 | | 9/2002 | |
| JP | 2014-195715 | | 10/2014 | |
| JP | 2014-235657 | | 12/2014 | |
| JP | 2018-010488 | | 1/2018 | |
| WO | WO-0025269 A1 | * | 5/2000 | ............. A63F 13/52 |

OTHER PUBLICATIONS

U.S. Appl. No. 18/117,950, filed Mar. 6, 2022, Yutaka Hiramuki.

* cited by examiner

F I G. 1
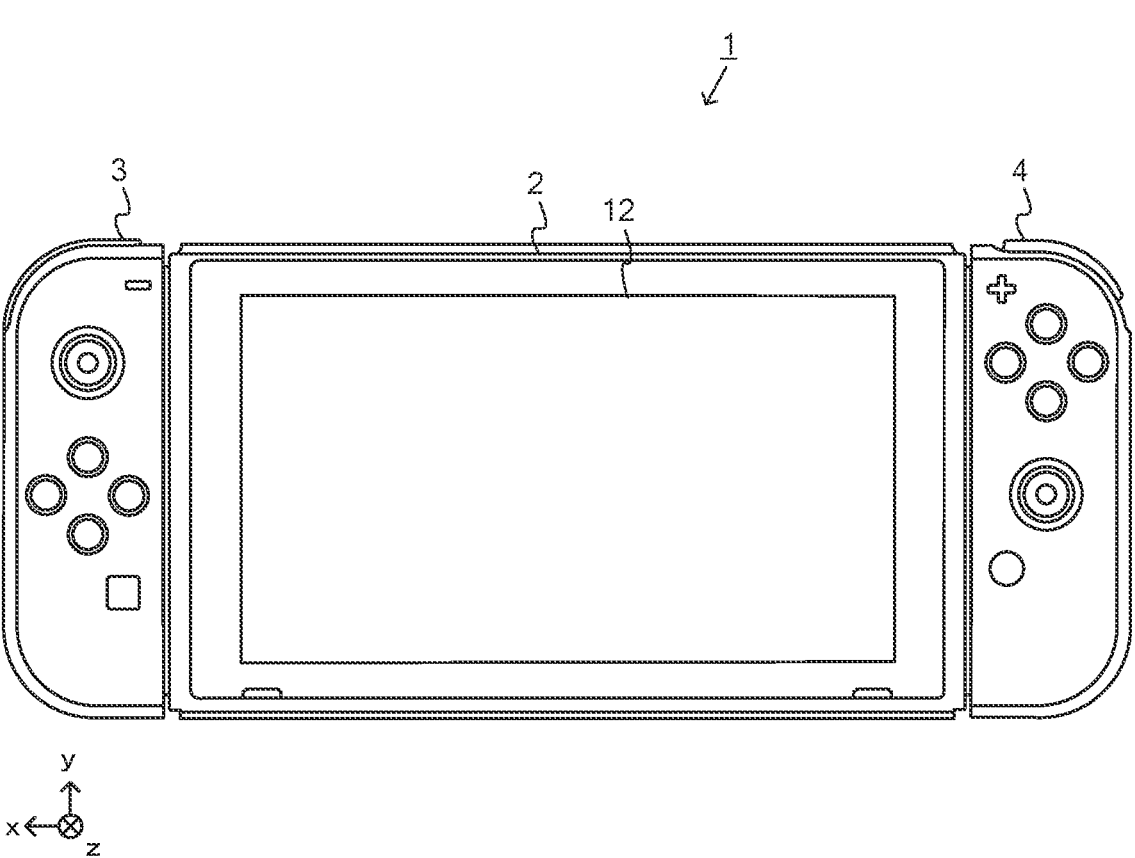

F I G.  2
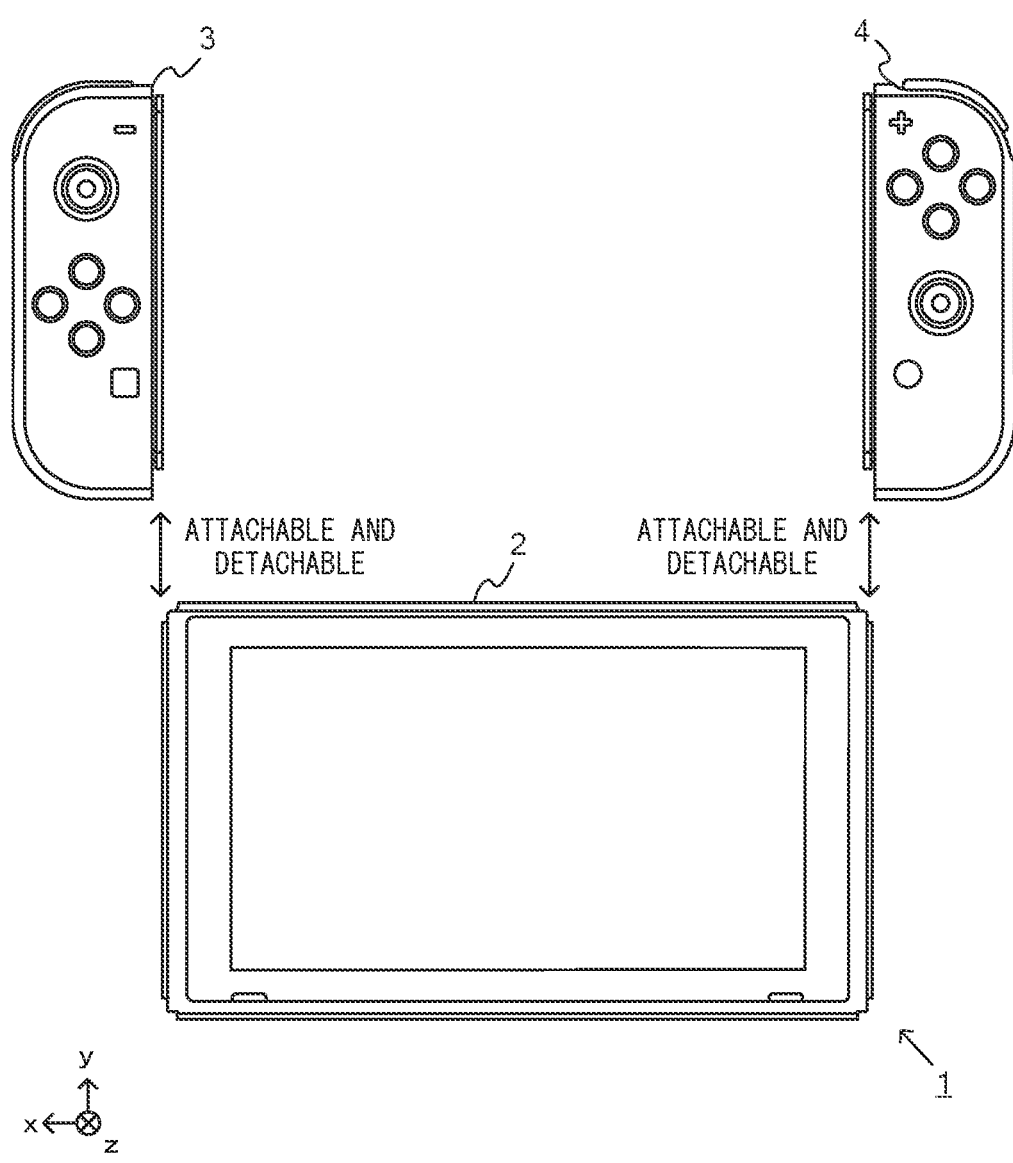

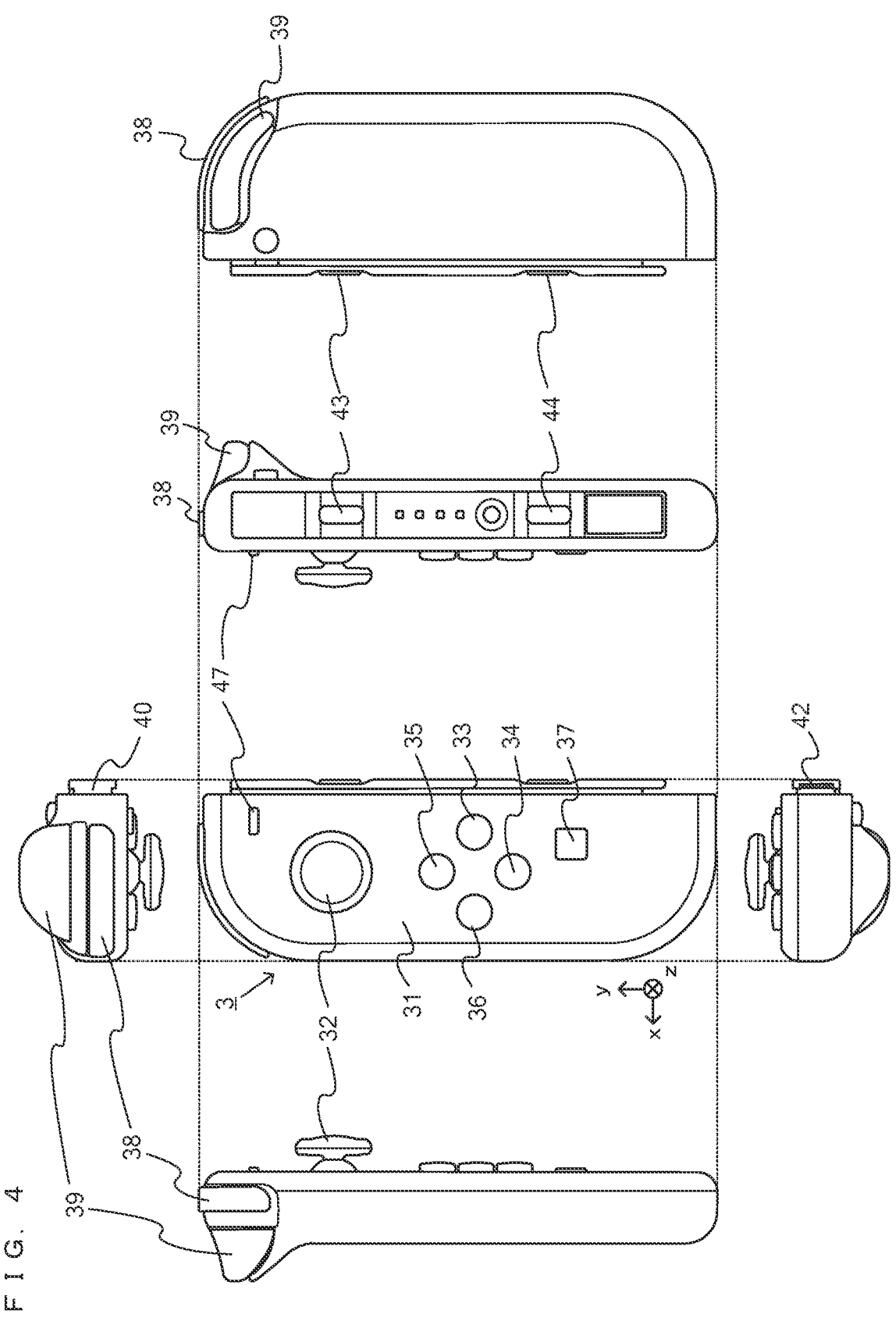
F I G. 4

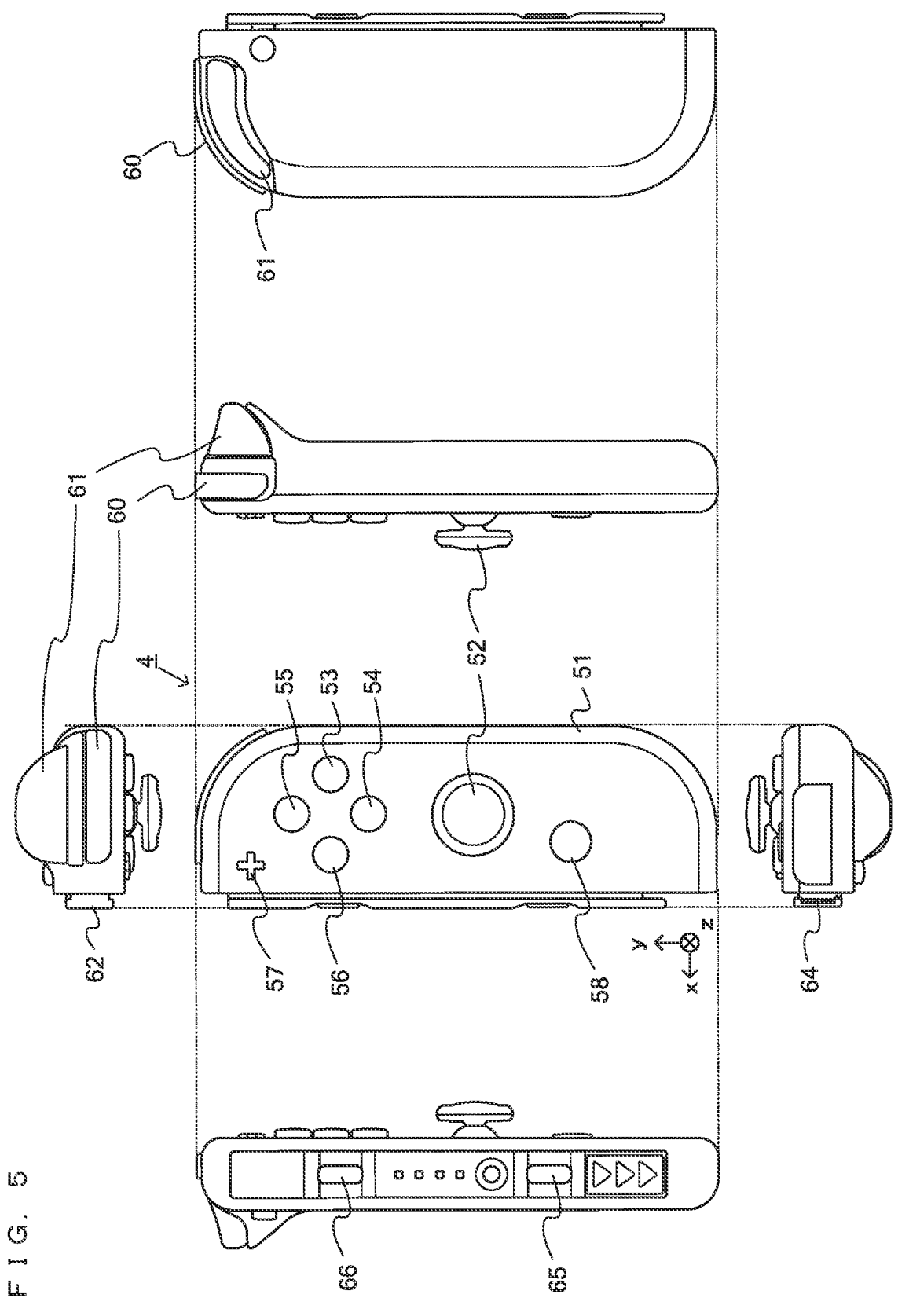
F I G. 5

F I G. 6
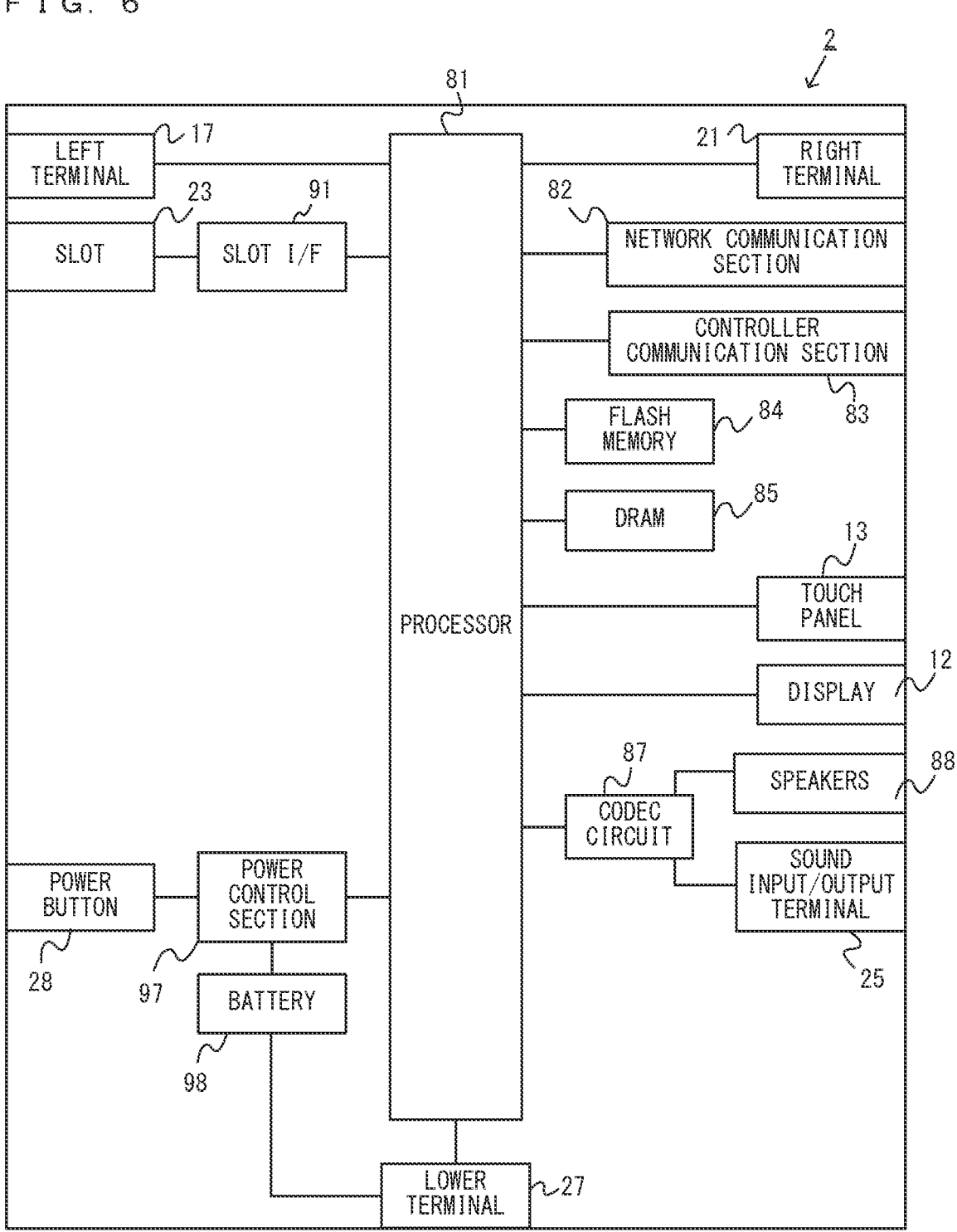

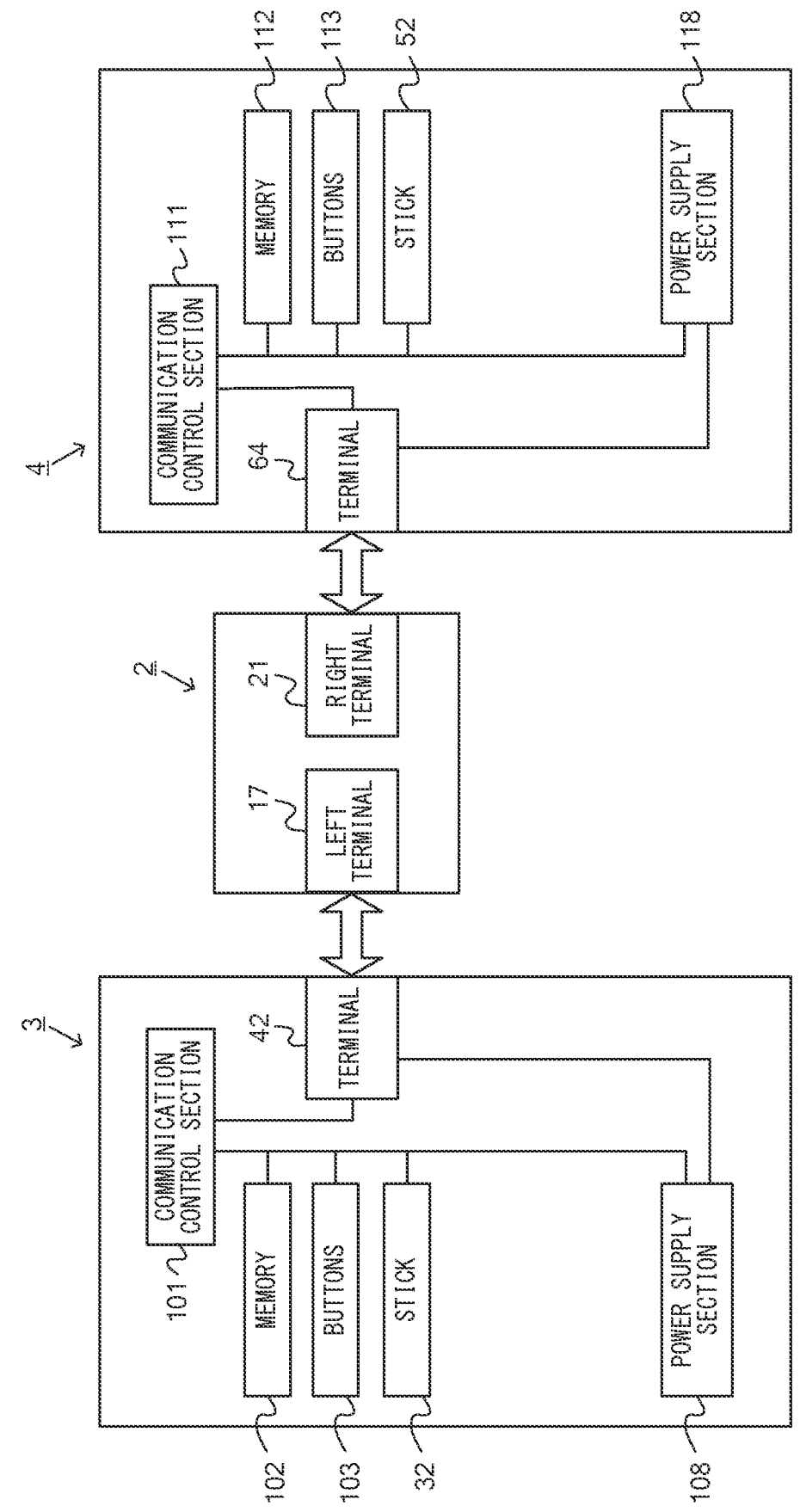
F I G. 7

F I G. 8
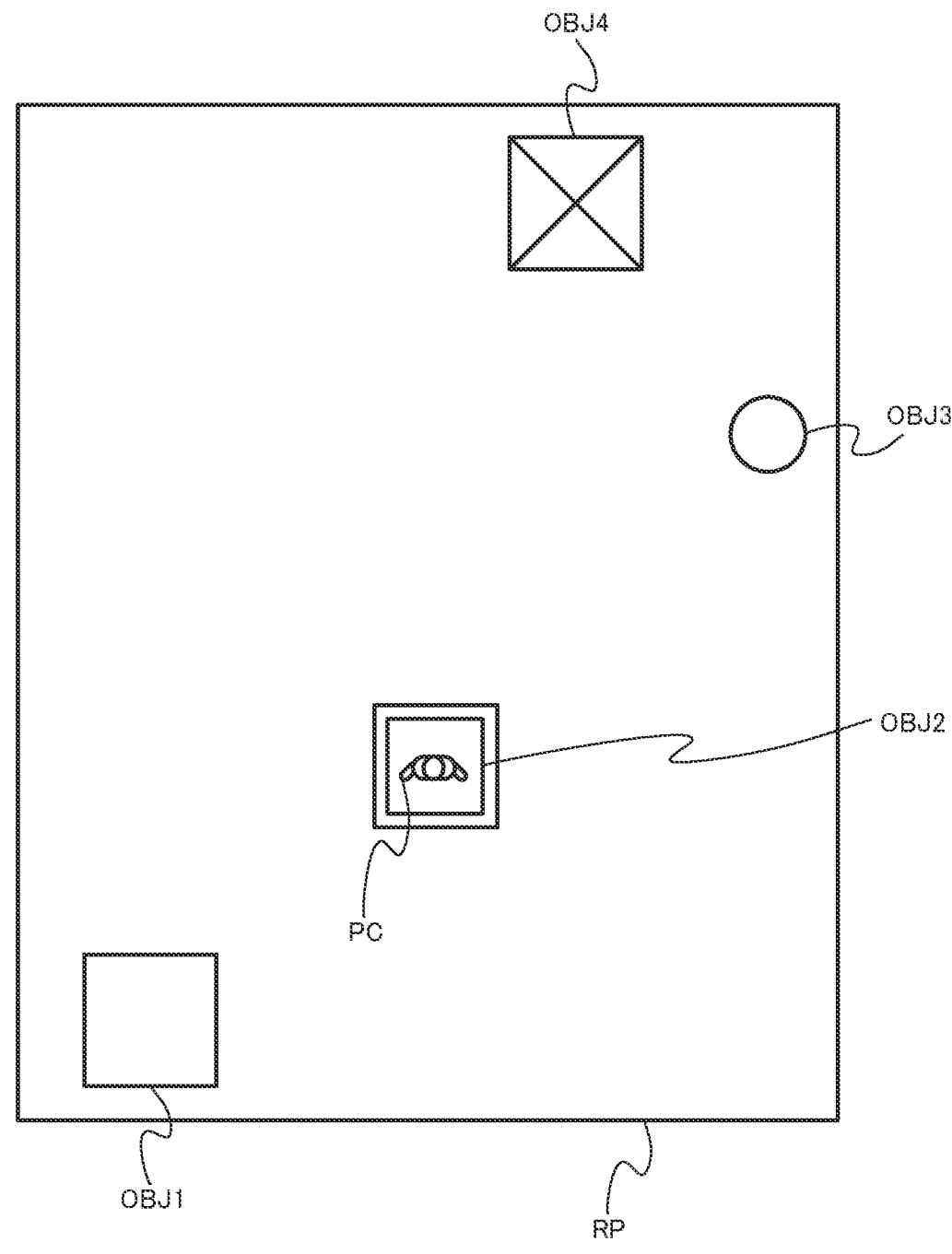

F I G. 9
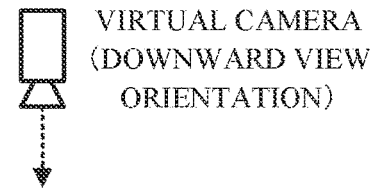
VIRTUAL CAMERA
(DOWNWARD VIEW
ORIENTATION)
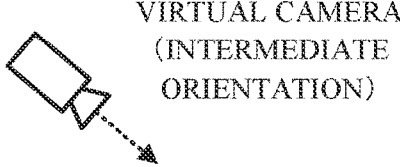
VIRTUAL CAMERA
(INTERMEDIATE
ORIENTATION)
VIRTUAL CAMERA
(HORIZONTAL
ORIENTATION)
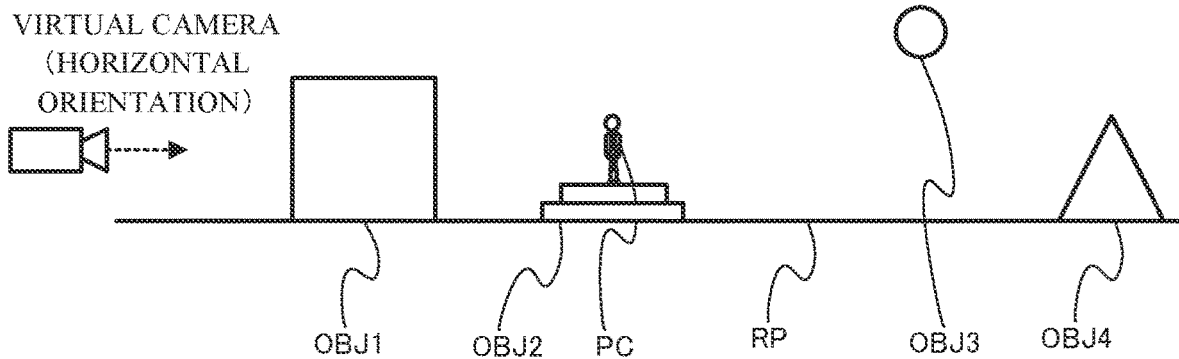
OBJ1      OBJ2    PC      RP      OBJ3    OBJ4

F I G.  1 0
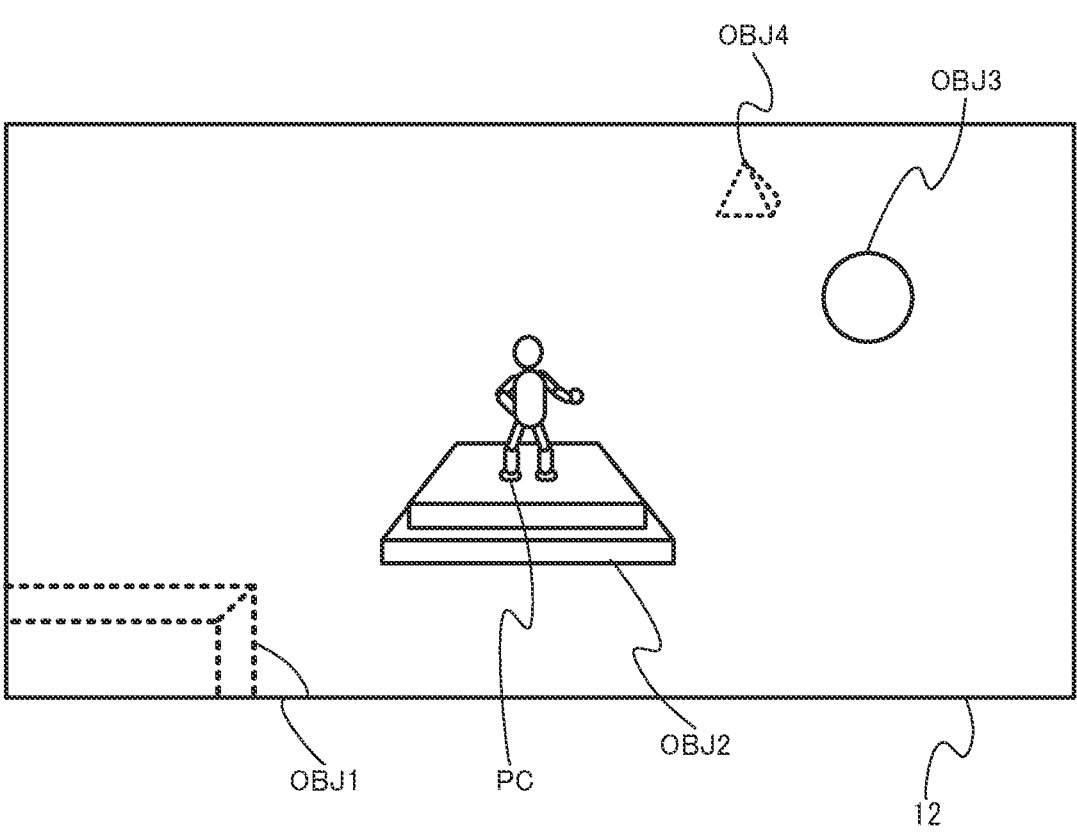

F I G.  1 1
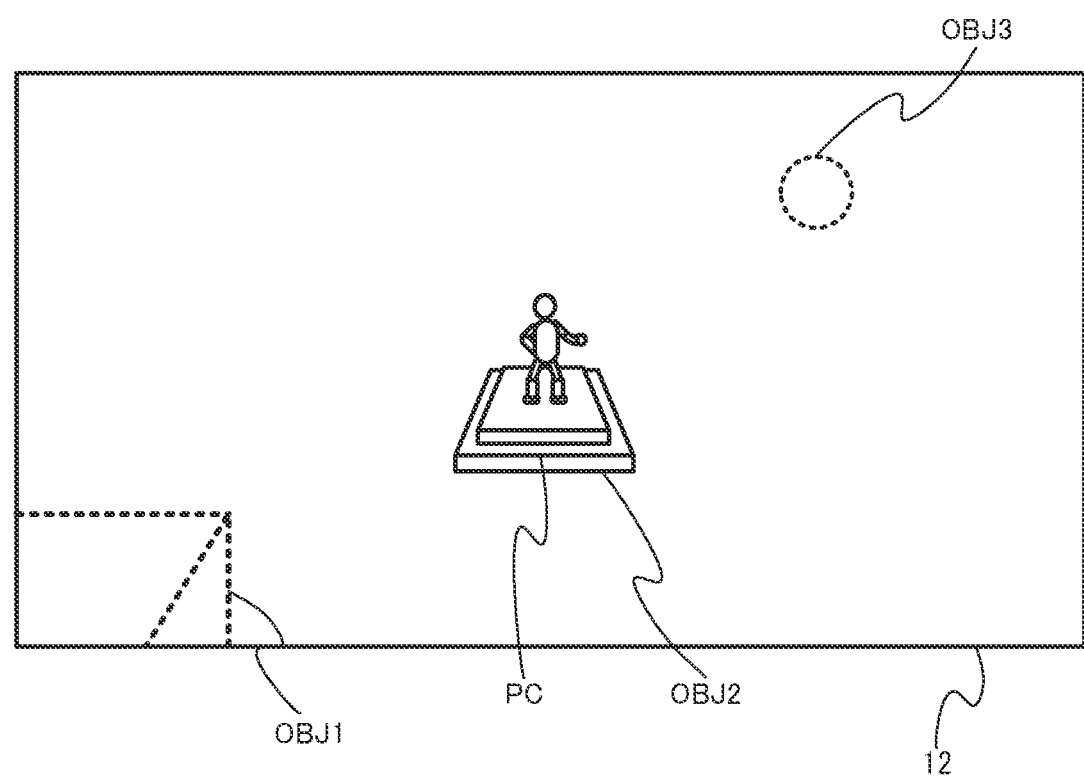

F I G.  1 2
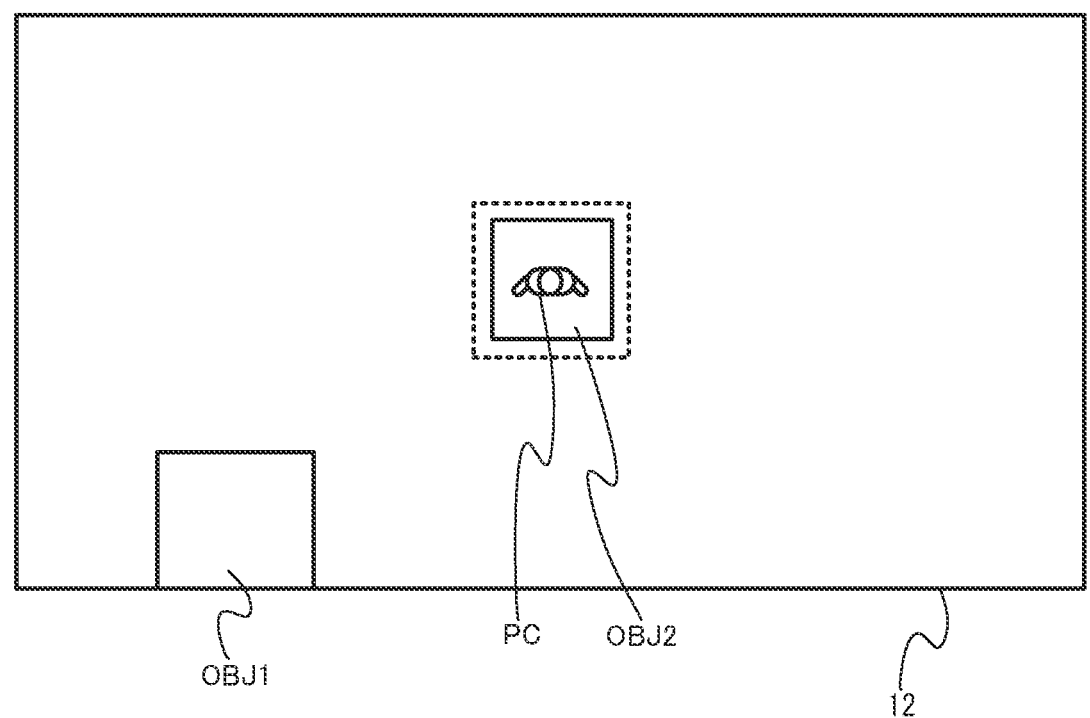

F I G .  1 3
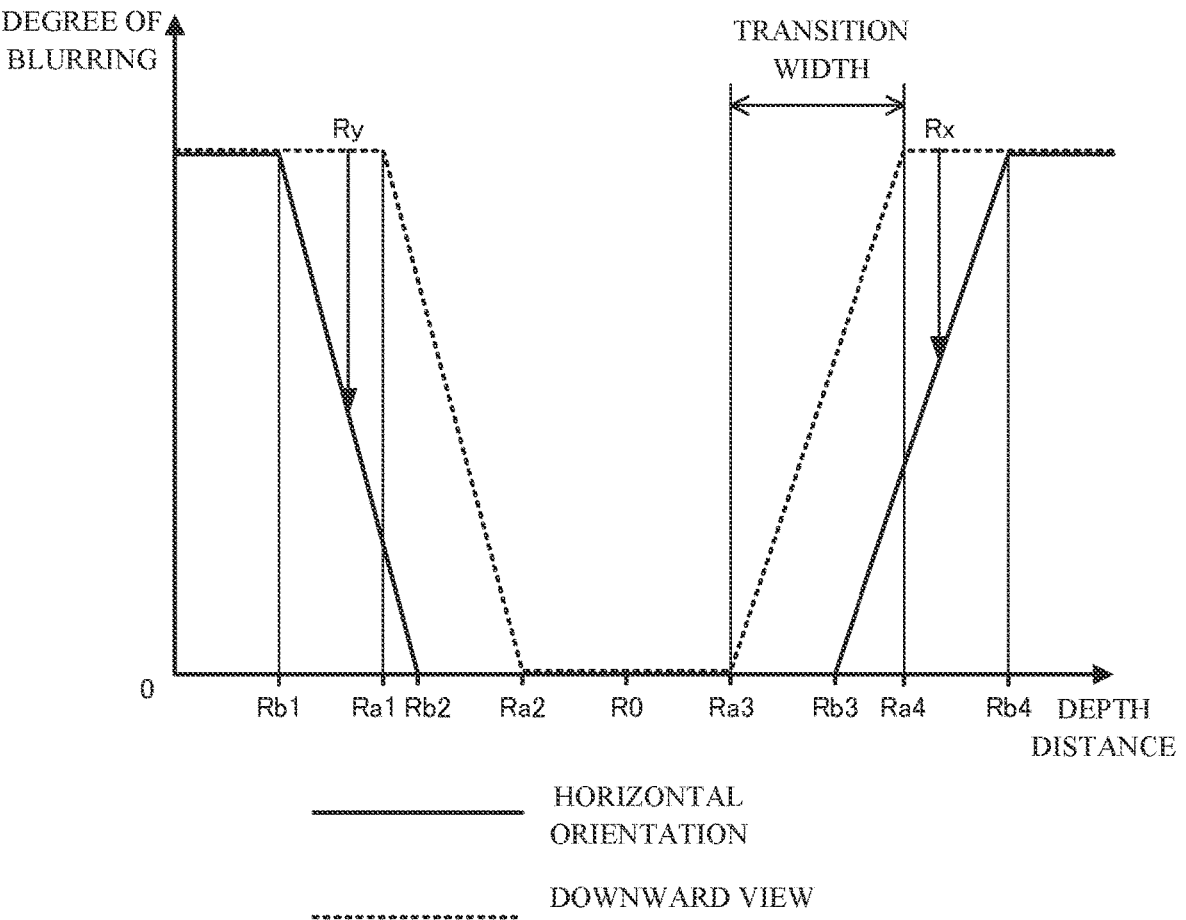
DEGREE OF BLURRING
TRANSITION WIDTH
Ry
Rx
0
Rb1   Ra1 Rb2   Ra2   R0   Ra3   Rb3 Ra4   Rb4   DEPTH DISTANCE
——————  HORIZONTAL ORIENTATION
.......................  DOWNWARD VIEW ORIENTATION F I G.  1 4
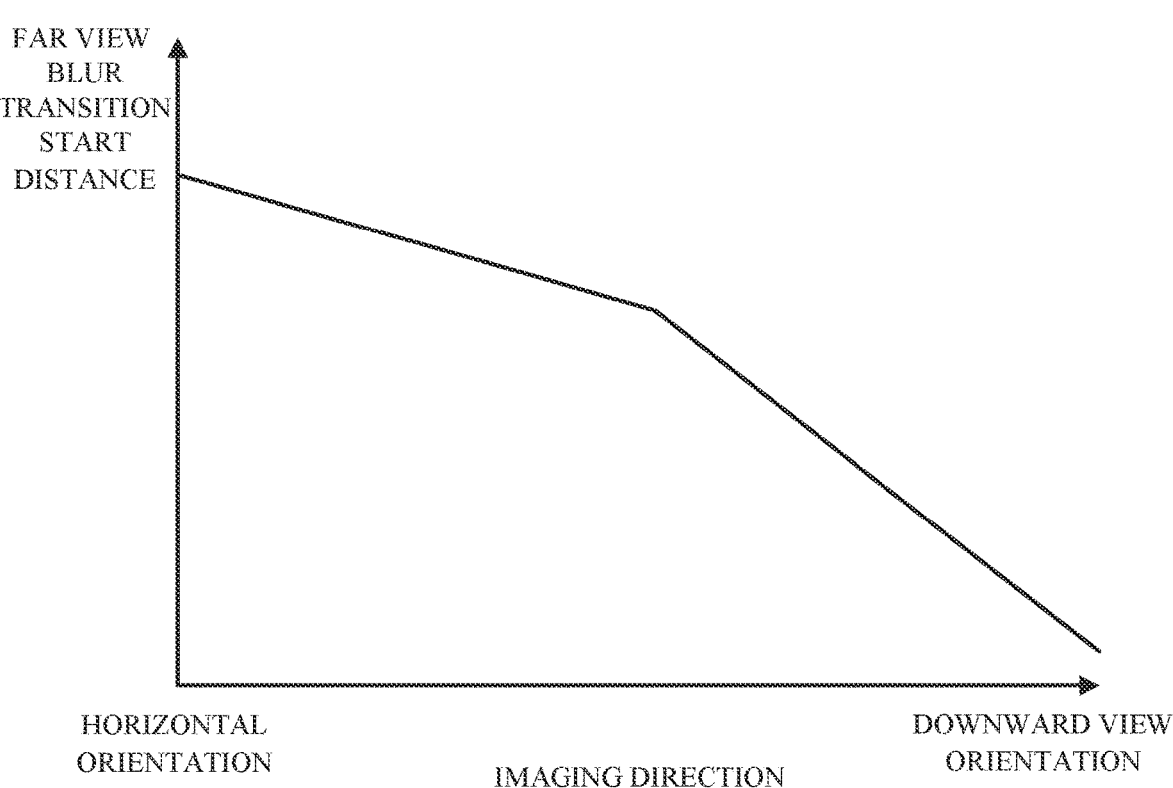

F I G. 1 5
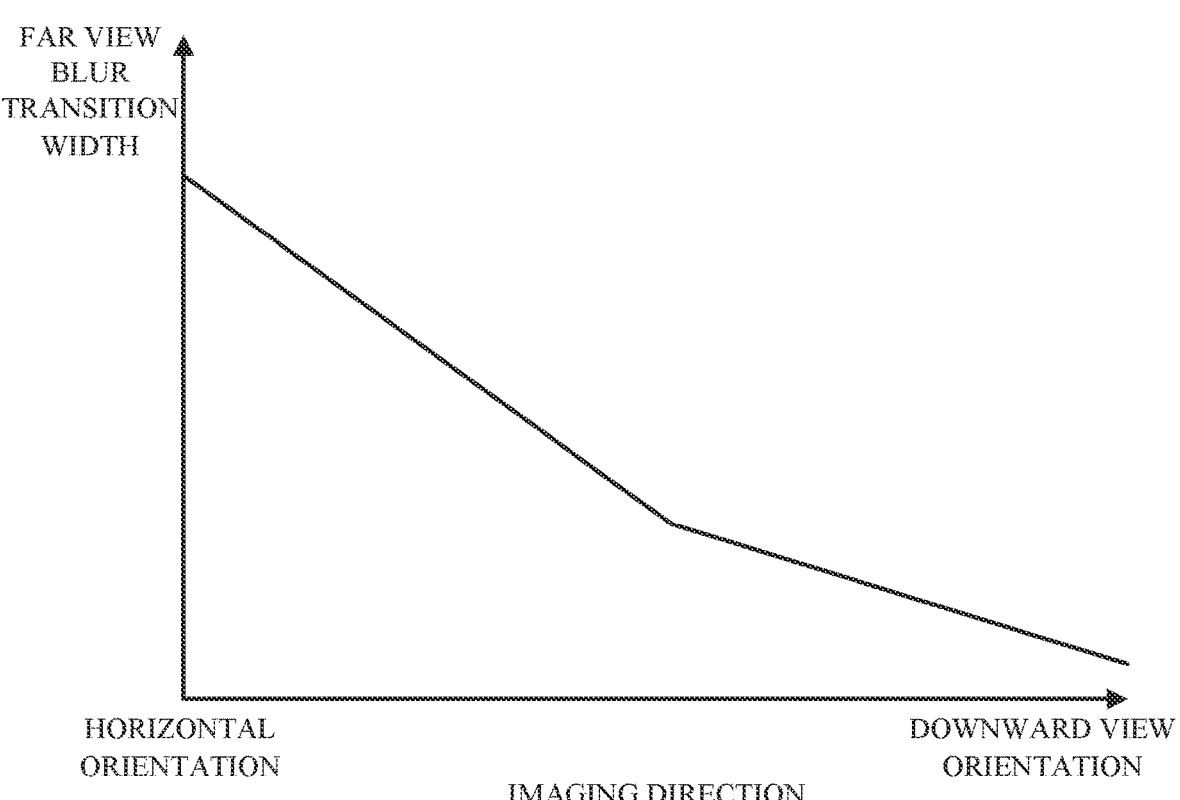

F I G.  1 6
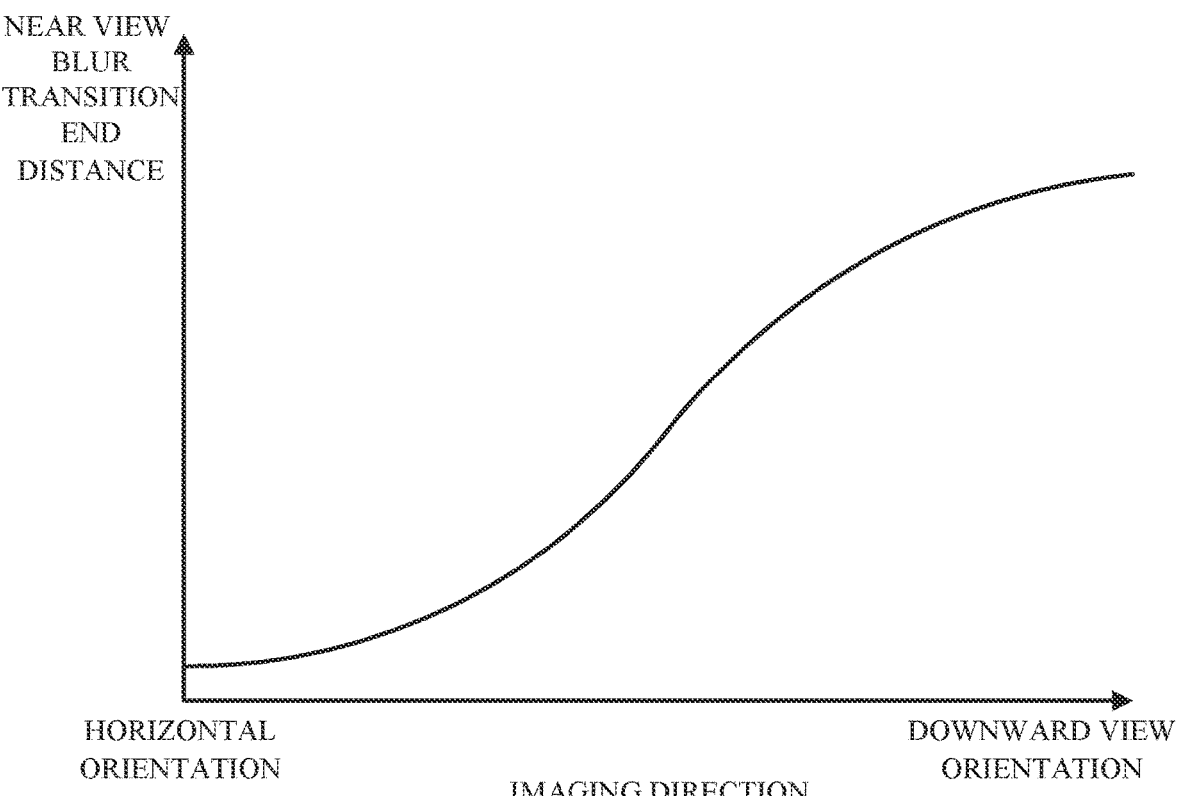

F I G .  1 7
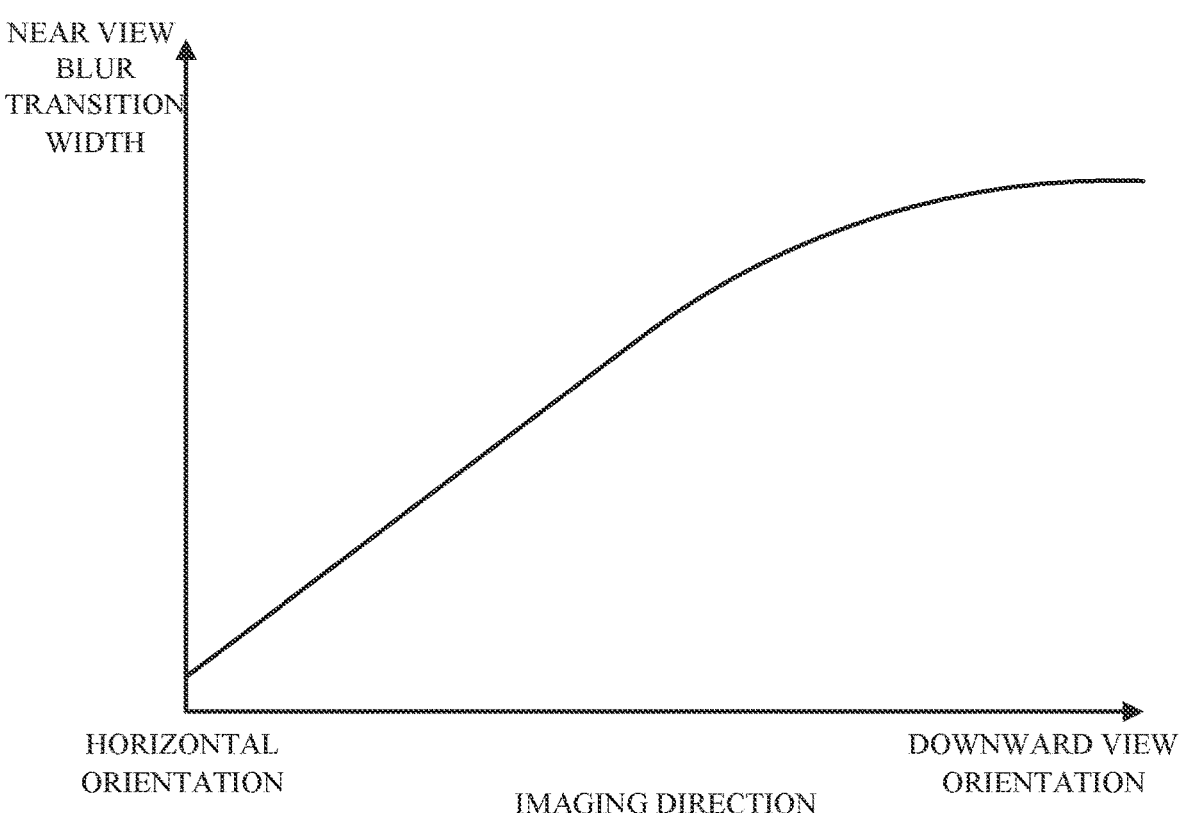
NEAR VIEW
BLUR
TRANSITION
WIDTH
HORIZONTAL
ORIENTATION
IMAGING DIRECTION
DOWNWARD VIEW
ORIENTATION F I G.  1 8
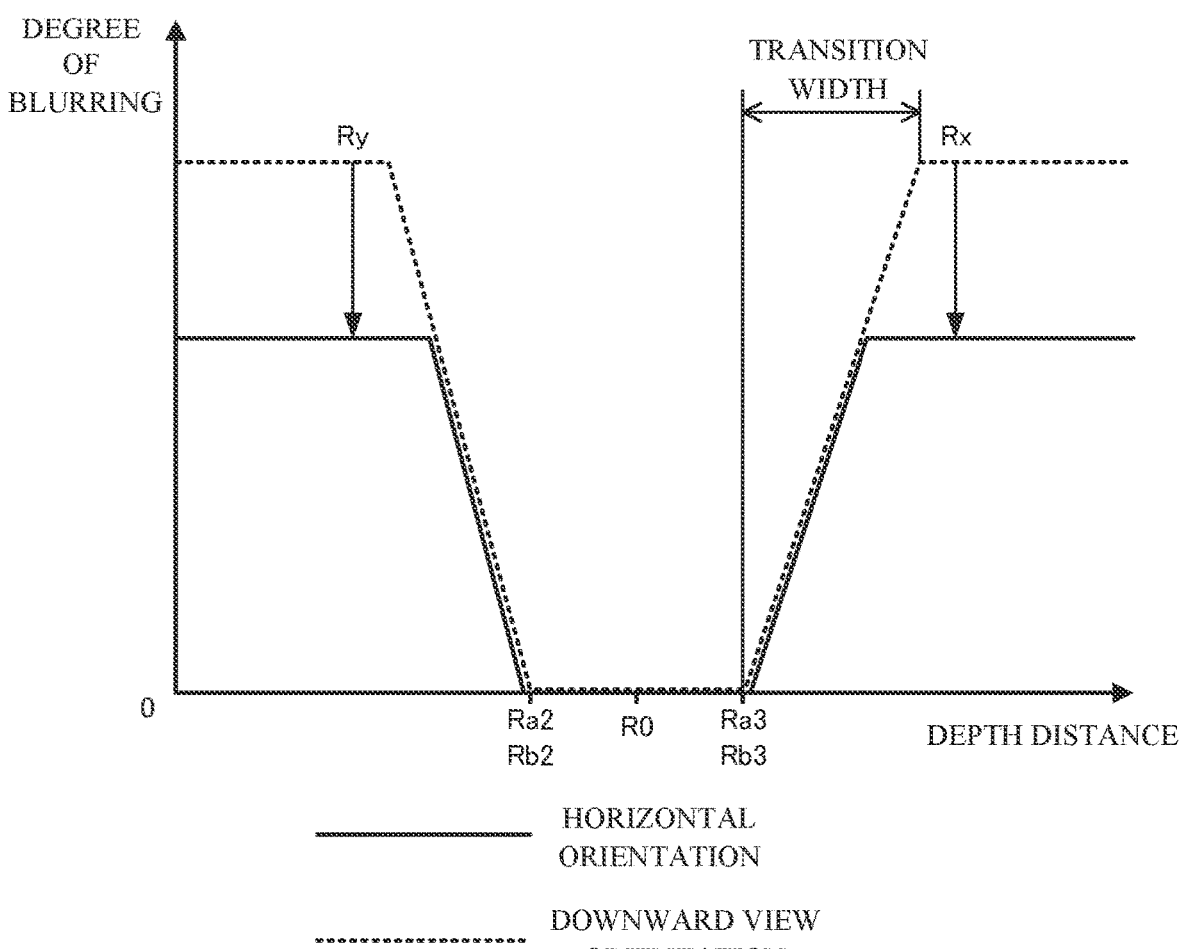

F I G.  1 9
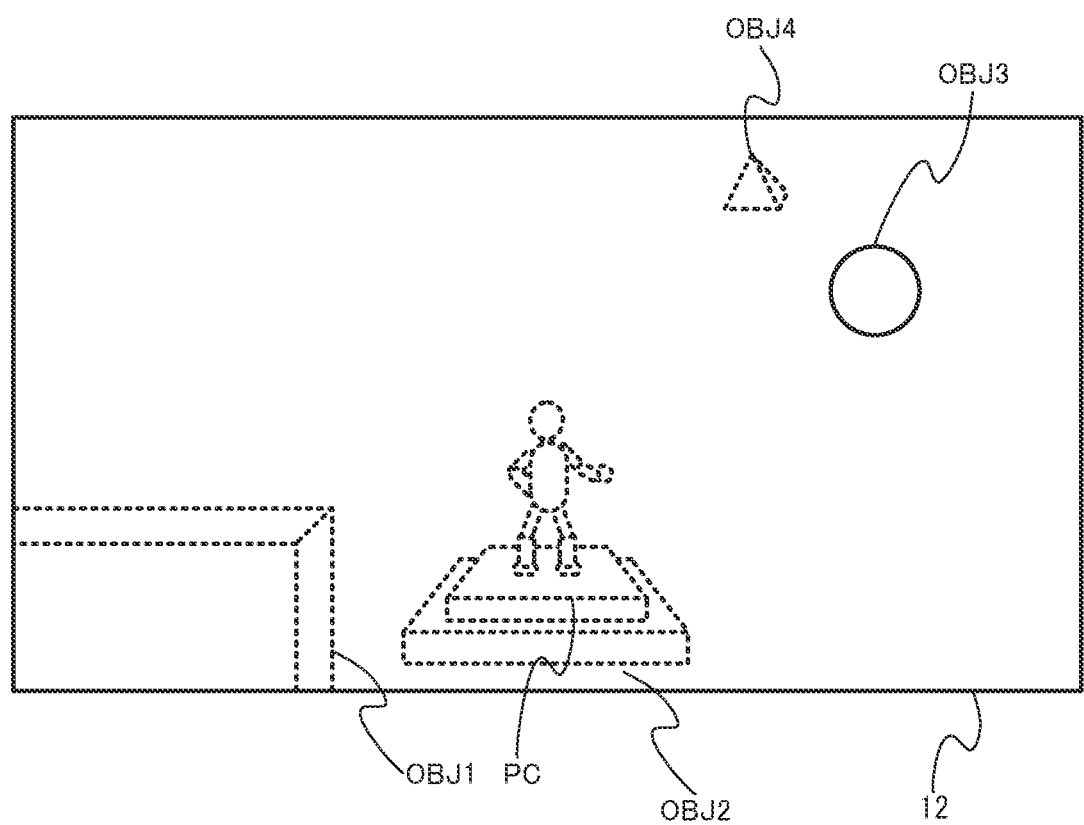

F I G.  2 0
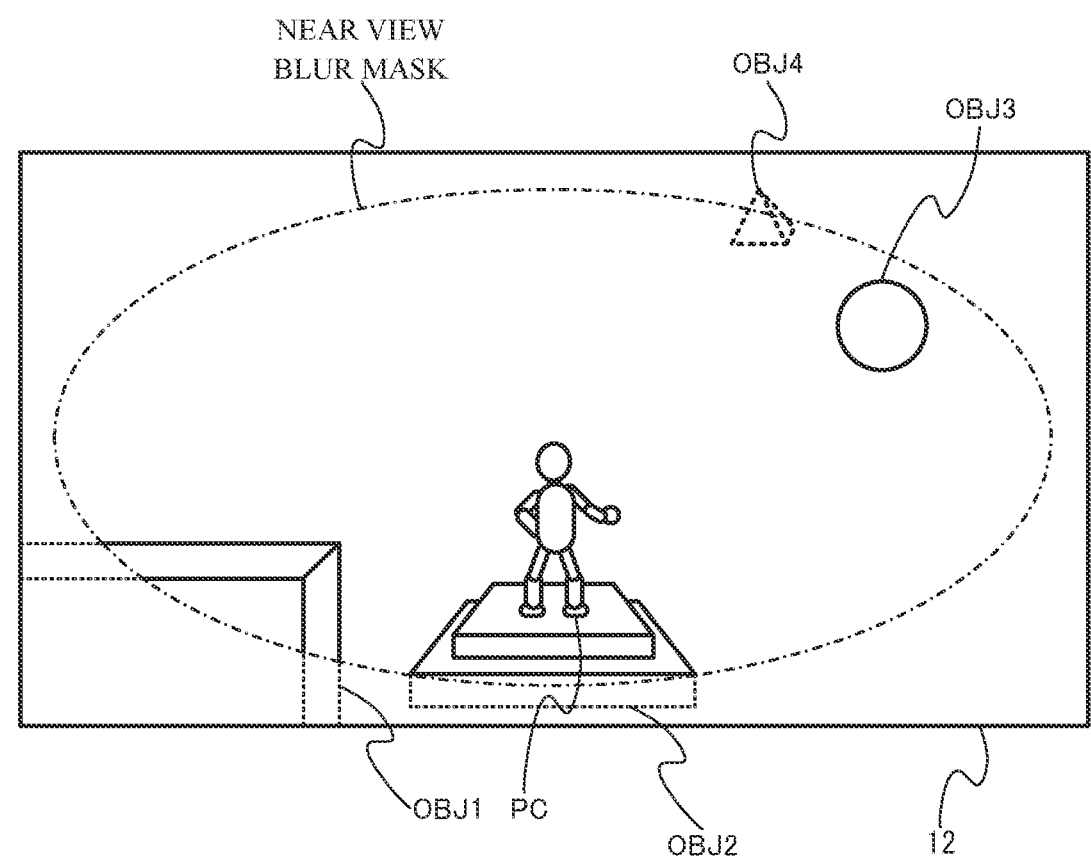

F I G.  2 1
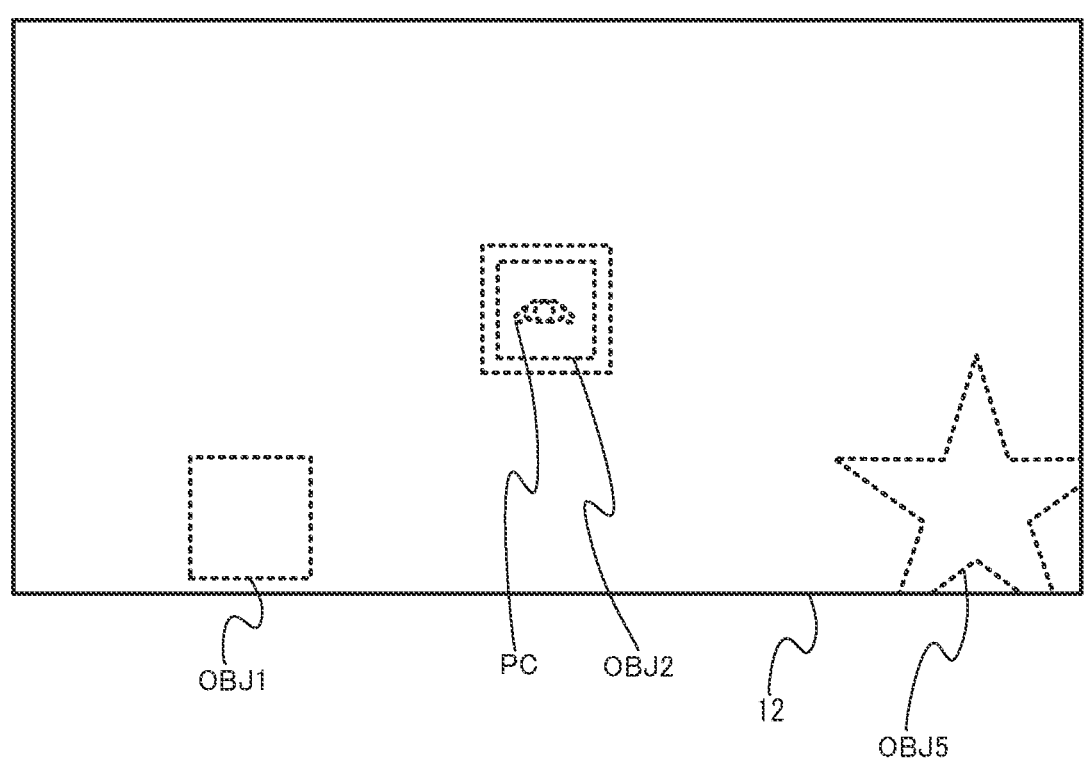

F I G. 2 2
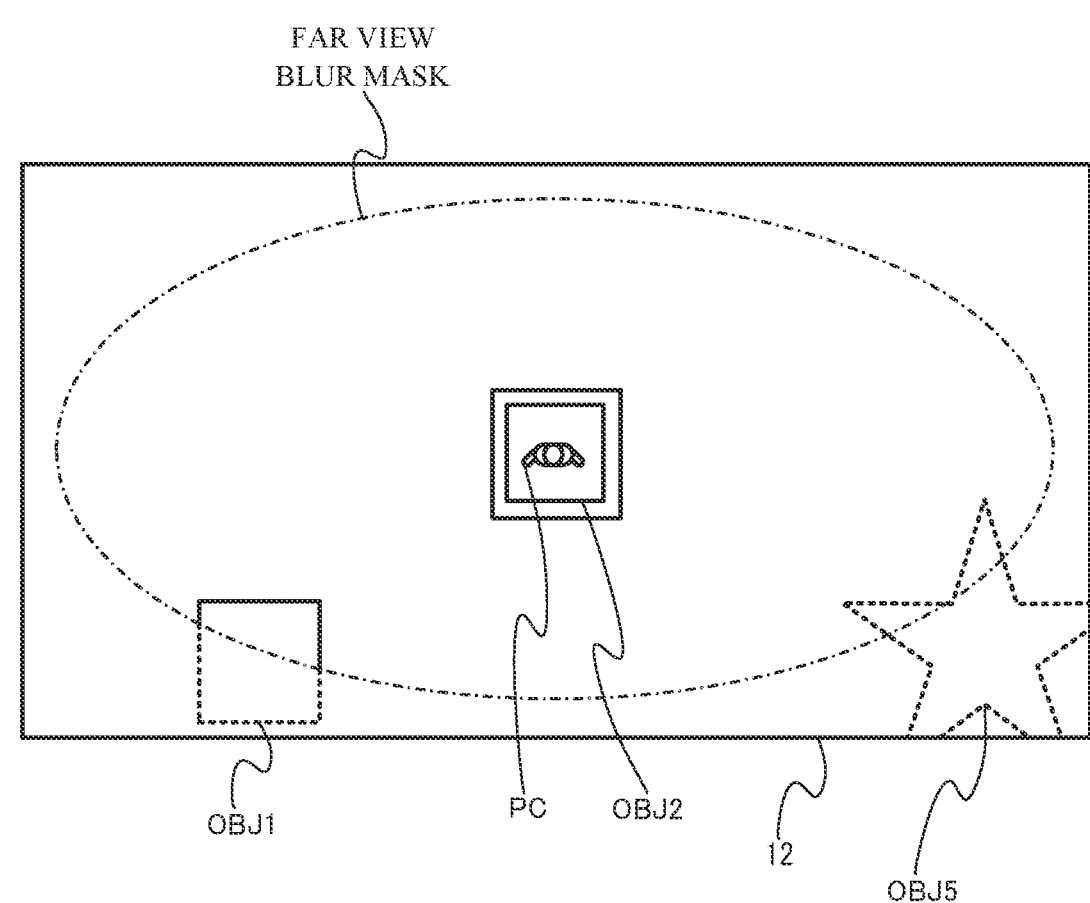

F I G.  2 4
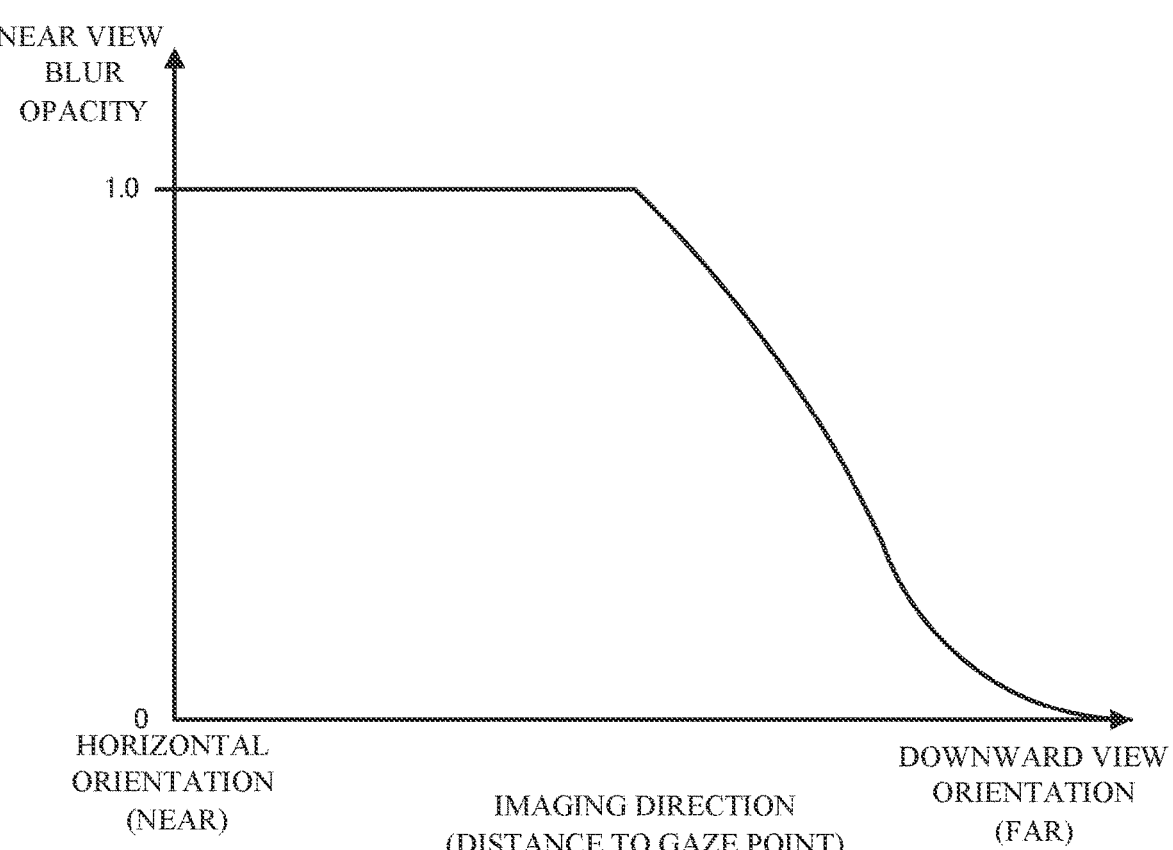

F I G .  2 5
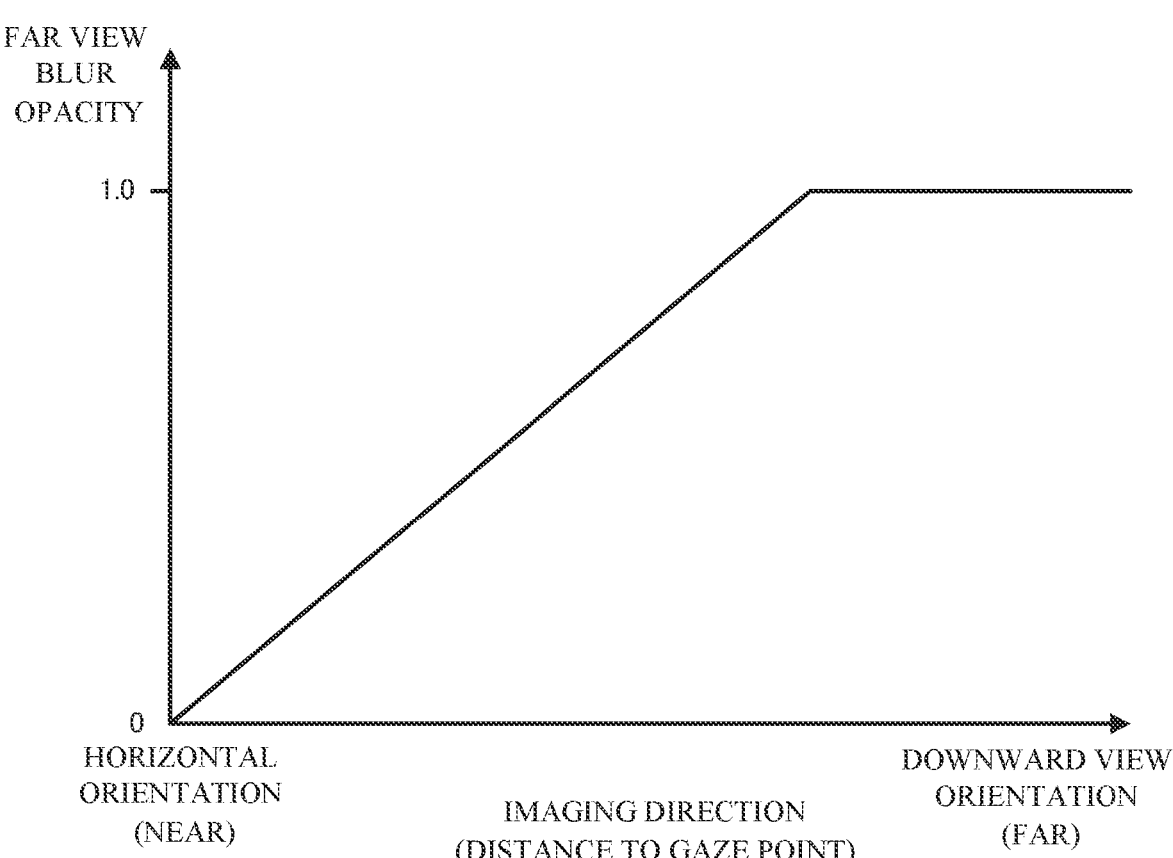

F I G. 2 6
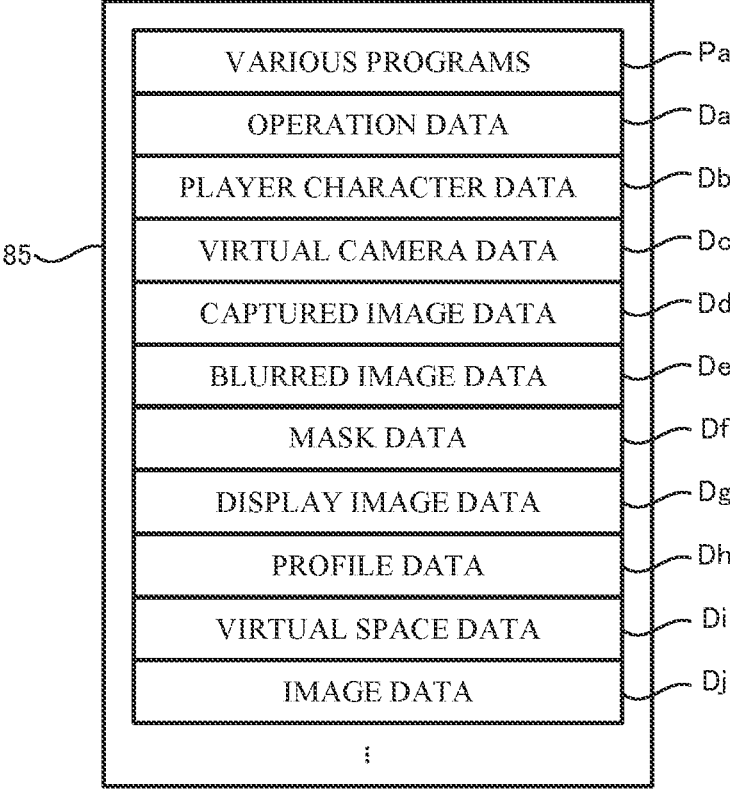

1

STORAGE MEDIUM STORING INFORMATION PROCESSING PROGRAM, INFORMATION PROCESSING APPARATUS, INFORMATION PROCESSING SYSTEM, AND INFORMATION PROCESSING METHOD

CROSS REFERENCE TO RELATED APPLICATIONS

This application claims priority to Japanese Patent Application Nos. 2022-50293 and 2022-50294, filed on Mar. 25, 2022, the entire contents of which are incorporated herein by reference.

FIELD

The technology disclosed herein relates to information processing program-storing storage media, information processing apparatuses, information processing systems, and information processing methods that perform a process of displaying an image of a virtual space.

BACKGROUND AND SUMMARY

There has conventionally been an information processing program that causes a computer to execute a process of displaying an image of a virtual space captured by a virtual camera. For example, that information processing program displays an image of a virtual space in which a distance range in front of and beyond a reference location in which the image is not blurred is increased with an increase in the distance between the virtual camera and the reference location.

However, in the above information processing program, the distance across which an image is not blurred is changed, depending on the distance from the reference location. Therefore, when an image of a virtual space for which the reference location is near and which covers a far and wide area is displayed, a far view may be blurred, resulting in a poor wide view.

With the above in mind, it is an object of the present example is to provide an information processing program-storing storage medium, information processing apparatus, information processing system, and information processing method that are capable of providing a display image with improved visibility.

To achieve the object, the present example may have the following features, for example.

An example configuration of a non-transitory computer-readable storage medium having stored therein an information processing program according to the present example is executed by a computer of an information processing apparatus. The information processing program causes the computer to perform operations comprising: generating a blurred image by blurring an image of a virtual space in a range of view from a virtual camera with a degree of blurring depending on a distance from the virtual camera; and performing a process of outputting the blurred image on a display screen. In the generating the blurred image, the blurred image is generated with the degree of blurring additionally depending on an imaging direction of the virtual camera.

Thus, an image blurred with the degree of blurring depending on the imaging direction of the virtual camera can be displayed, resulting in an improvement in the visibility of the image.

In the generating the blurred image, in a range in which the distance from the virtual camera is longer than a first distance, the degree of blurring may be changed and increased with an increase in the distance from the virtual camera, and may be changed and decreased for a location where the distance from the virtual camera is a second distance longer than the first distance, based on the imaging direction of the virtual camera.

Thus, the degree of blurring of a far view blur for a location having a longer distance from the virtual camera than the first distance can be decreased, depending on the imaging direction of the virtual camera, resulting in an improvement in the visibility of a far view image in the range of view from the virtual camera.

In the generating the blurred image, in a range in which the distance from the virtual camera is shorter than a first distance, the degree of blurring may be changed and increased with a decrease in the distance from the virtual camera, and may be changed and decreased for a location where the distance from the virtual camera is a third distance shorter than the first distance, based on the imaging direction of the virtual camera.

Thus, the degree of blurring of a near view blur for a location having a shorter distance from the virtual camera than the first distance can be decreased, depending on the imaging direction of the virtual camera, resulting in an improvement in the visibility of a near view image in the range of view from the virtual camera.

In the generating the blurred image, in a range in which the distance from the virtual camera is longer than a first distance, the degree of blurring may be changed and increased with an increase in the distance from the virtual camera, and may be changed and decreased for a location where the distance from the virtual camera is a second distance longer than the first distance, based on the imaging direction of the virtual camera, and in a range in which the distance from the virtual camera is shorter than the first distance, the degree of blurring may be changed and increased with a decrease in the distance from the virtual camera, and may be changed and decreased for a location where the distance from the virtual camera is a third distance shorter than the first distance, based on the imaging direction of the virtual camera.

Thus, the degree of blurring of a near view blur for a location having a shorter distance from the virtual camera than the first distance, and the degree of blurring of a far view blur for a location having a longer distance from the virtual camera than the first distance, can be decreased, depending on the imaging direction of the virtual camera, resulting in an improvement in the visibility of a near view image and a far view image in the range of view from the virtual camera.

In the generating the blurred image, the degree of blurring may be changed and decreased for the second distance with a decrease in a difference between a direction in which a reference plane extends in the virtual space and the imaging direction.

Thus, when the imaging direction of the virtual camera is chosen to provide a far and wide view along the reference plane, the visibility of a far view image in the range of view from the virtual camera can be improved.

In the generating the blurred image, the degree of blurring may be changed and decreased for the third distance with a decrease in a difference between a direction in which a reference plane extends in the virtual space and the imaging direction.

Thus, when the imaging direction of the virtual camera is chosen to extend along the reference plane, a number of objects on the reference plane may be located in the vicinity of the virtual camera, but the visibility of a near view image in the range of view from the virtual camera can be improved.

The reference plane may be set such that a game object disposed further in the virtual space is imaged when the imaging direction of the virtual camera is parallel to the reference plane than when the imaging direction of the virtual camera is perpendicular to the reference plane.

Thus, the visibility of a far view image in the range of view from the virtual camera can be improved when the imaging direction of the virtual camera is chosen to provide a far and wide view along the reference plane than when the imaging direction of the virtual camera is chosen to extend down toward the reference plane.

The reference plane is set perpendicular to a downward direction of the virtual space.

Thus, when the imaging direction of the virtual camera is chosen to allow the virtual camera to cover a game object disposed at a far location in the virtual space, the visibility of a far view of that virtual object in the range of view from the virtual camera can be improved.

The information processing program may further cause the computer to perform operations comprising: when the imaging direction of the virtual camera is changed based on a user's first input, changing a distance between a gaze point of the virtual camera and the virtual camera, depending on the imaging direction.

Thus, when a large number of game objects are disposed on the reference plane in the virtual space, an image including a relatively large number of game objects in the range of view can be generated, depending on the imaging direction of the virtual camera, and the visibility of game objects in the vicinity of the gaze point can be improved.

In the changing the distance, the distance between the gaze point and the virtual camera may be decreased with a decrease in the difference between the direction in which the reference plane extends and the imaging direction.

Thus, when a game object is disposed on the reference plane, the visibility of a near view of that game object on the reference plane in the range of view from the virtual camera can be improved.

The information processing program may further cause the computer to perform operations comprising: moving a player character disposed in the virtual space, based on the user's second input. In the changing the distance, the virtual camera may be controlled with the gaze point set at the player character.

Thus, the visibility of a player character that is moved according to the user's operation can be improved.

In the generating the blurred image, the blurred image may be generated by blurring the image of the virtual space in the range of view from the virtual camera, depending on a distance between a location in the virtual space of each pixel of the image and the virtual camera.

Thus, an image that is blurred, depending on the distance from the virtual camera can be generated.

The present example may also be carried out in the form of an information processing apparatus, information processing system, and information processing method.

According to the present example, an image that is blurred with the degree of blurring depending on the imaging direction of the virtual camera can be displayed, resulting in an improvement in the visibility of the image.

These and other objects, features, aspects and advantages of the present exemplary embodiment will become more apparent from the following detailed description of the present exemplary embodiment when taken in conjunction with the accompanying drawings.

BRIEF DESCRIPTION OF THE DRAWINGS

FIG. 1 is a diagram illustrating a non-limiting example of a state where a left controller 3 and a right controller 4 are attached to a main body apparatus 2, FIG. 2 is a diagram illustrating a non-limiting example of a state where a left controller 3 and a right controller 4 are detached from a main body apparatus 2, FIG. 4 illustrates six orthogonal views of a non-limiting example of a left controller 3, FIG. 5 illustrates six orthogonal views of a non-limiting example of a right controller 4, FIG. 6 is a block diagram illustrating a non-limiting example of an internal configuration of a main body apparatus 2, FIG. 7 is a block diagram illustrating non-limiting examples of internal configurations of a main body apparatus 2, a left controller 3, and a right controller 4, FIG. 8 is a diagram illustrating a non-limiting example of a virtual space which is displayed on a display 12 when viewed from above, FIG. 9 is a diagram for describing a non-limiting example of a location and orientation of a virtual camera disposed in a virtual space, FIG. 10 is a diagram illustrating a non-limiting example of an image of a virtual space captured by a virtual camera that is aimed in a horizontal direction in a virtual space, FIG. 11 is a diagram illustrating a non-limiting example of an image of a virtual space captured by a virtual camera that is aimed in a diagonally downward direction in a virtual space, FIG. 12 is a diagram illustrating a non-limiting example of an image of a virtual space captured by a virtual camera that is aimed in a directly downward direction in a virtual space, FIG. 13 is a diagram illustrating a non-limiting example of a relationship between a depth distance from a virtual camera and the degree of blurring, FIG. 14 is a diagram illustrating a non-limiting example of a relationship between the imaging direction of a virtual camera and a far view blur start distance, FIG. 15 is a diagram illustrating a non-limiting example of a relationship between the imaging direction of a virtual camera and a far view blur transition width, FIG. 16 is a diagram illustrating a non-limiting example of a relationship between the imaging direction of a virtual camera and a near view blur end distance, FIG. 17 is a diagram illustrating a non-limiting example of a relationship between the imaging direction of a virtual camera and a near view blur transition width, FIG. 18 is a diagram illustrating another non-limiting example of a relationship between a depth distance from a virtual camera and the degree of blurring, FIG. 19 is a diagram illustrating a non-limiting example of an image of a virtual space captured by a virtual camera that is aimed in a horizontal direction in a virtual space, the image being displayed without a near view blur masking process, FIG. 20 is a diagram illustrating a non-limiting example of an image of a virtual space captured by a virtual camera that is aimed in a horizontal direction in a virtual space, the image being displayed after being subjected to a near view blur masking process, FIG. 21 is a diagram illustrating a non-limiting example of an image of a virtual space captured by a virtual camera that is aimed in a directly downward direction in a virtual space, the image being displayed without a far view blur masking process, FIG. 22 is a diagram illustrating a non-limiting example of an image of a virtual space captured by a virtual camera that is aimed in a directly downward direction in a virtual space, the image being displayed after being subjected to a far view blur masking process, FIG. 24 is a diagram illustrating a non-limiting example of a relationship between the imaging direction of a virtual camera and the degree of near view blur masking, FIG. 25 is a diagram illustrating a non-limiting example of a relationship between the imaging direction of a virtual camera and the degree of far view blur masking, FIG. 26 is a diagram illustrating a non-limiting example of a data area set in a DRAM 85 of a main body apparatus 2.

DETAILED DESCRIPTION OF NON-LIMITING EXAMPLE EMBODIMENTS

Figure 3:
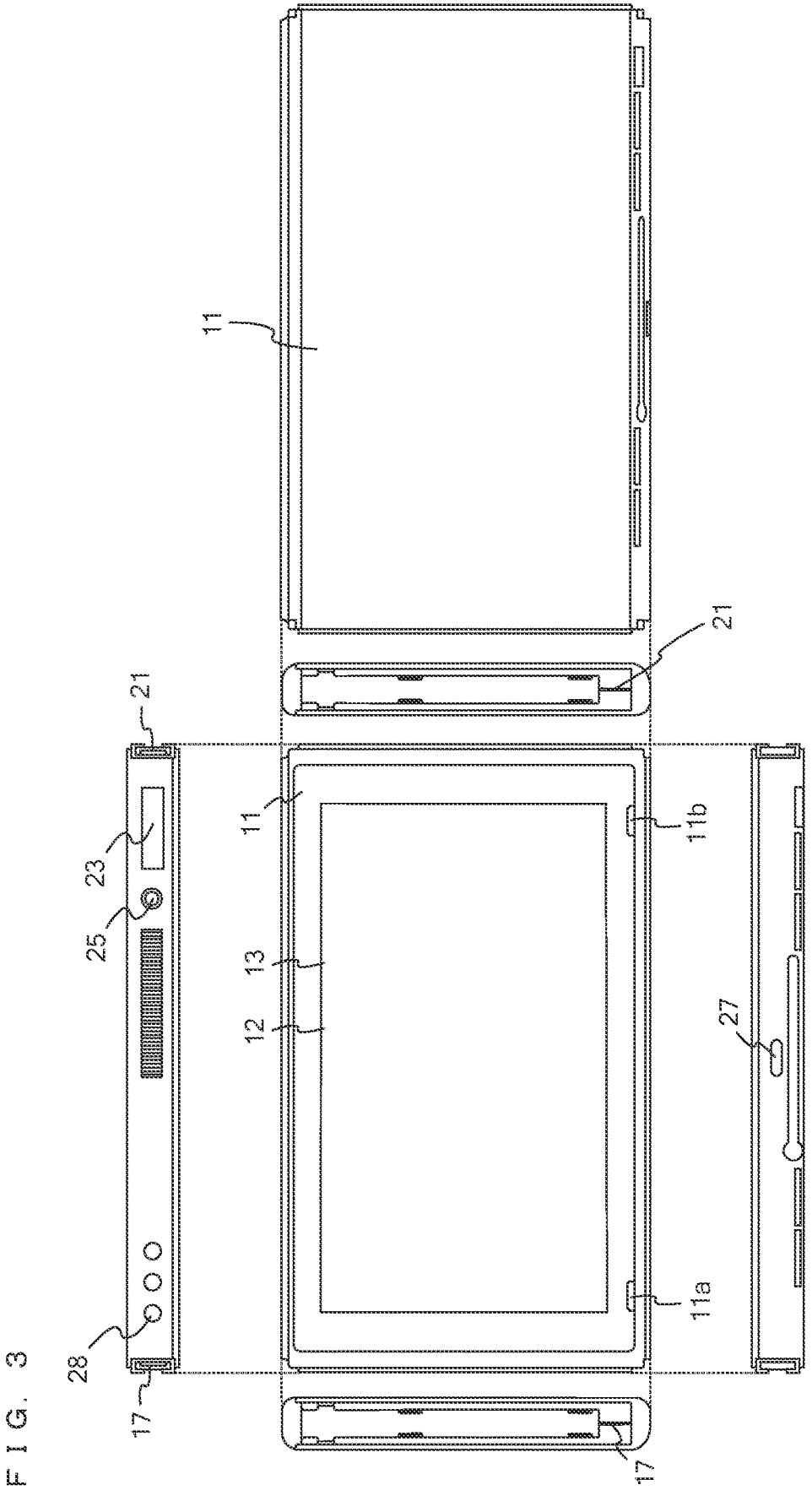
FIG. 3 illustrates six orthogonal views of a non-limiting example of a main body apparatus 2.

A game system according to the present example will now be described. An example of a game system 1 according to the present example includes a main body apparatus (information processing apparatus serving as the main body of a game apparatus in the present example) 2, a left controller 3, and a right controller 4. The left controller 3 and the right controller 4 are attachable to and detachable from the main body apparatus 2. That is, the user can attach the left controller 3 and the right controller 4 to the main body apparatus 2, and use them as a unified apparatus. The user can also use the main body apparatus 2 and the left controller 3 and the right controller 4 separately from each other (see FIG. 2). In the description that follows, a hardware configuration of the game system 1 of the present example is described, and thereafter, the control of the game system 1 of the present example is described.

FIG. 1 is a diagram illustrating an example of the state where the left controller 3 and the right controller 4 are attached to the main body apparatus 2. As illustrated in FIG. 1, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

FIG. 2 is a diagram illustrating an example of the state where each of the left controller 3 and the right controller 4 is detached from the main body apparatus 2. As illustrated in FIGS. 1 and 2, the left controller 3 and the right controller 4 are attachable to and detachable from the main body apparatus 2. It should be noted that hereinafter, the left controller 3 and the right controller 4 will occasionally be referred to collectively as a "controller".

FIG. 3 illustrates six orthogonal views of an example of the main body apparatus 2. As illustrated in FIG. 3, the main body apparatus 2 includes an approximately plate-shaped housing 11. In the present example, a main surface (in other words, a surface on a front side, i.e., a surface on which the display 12 is provided) of the housing 11 has a generally rectangular shape.

It should be noted that the shape and the size of the housing 11 are optional. As an example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As illustrated in FIG. 3, the main body apparatus 2 includes the display 12, which is provided on the main surface of the housing 11. The display 12 displays an image generated by the main body apparatus 2. In the present example, the display 12 is a liquid crystal display device (LCD). The display 12, however, may be a display device of any suitable type.

In addition, the main body apparatus 2 includes a touch panel 13 on the screen of the display 12. In the present example, the touch panel 13 allows multi-touch input (e.g., a capacitive touch panel). It should be noted that the touch panel 13 may be of any suitable type, e.g., it allows single-touch input (e.g., a resistive touch panel).

The main body apparatus 2 includes a speaker (i.e., a speaker 88 illustrated in FIG. 6) inside the housing 11. As illustrated in FIG. 3, speaker holes 11*a* and 11*b* are formed in the main surface of the housing 11. The speaker 88 outputs sounds through the speaker holes 11*a* and 11*b*.

The main body apparatus 2 also includes a left-side terminal 17 that enables wired communication between the main body apparatus 2 and the left controller 3, and a right-side terminal 21 that enables wired communication between the main body apparatus 2 and the right controller 4.

As illustrated in FIG. 3, the main body apparatus 2 includes a slot 23. The slot 23 is provided on an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

The main body apparatus 2 includes a lower-side terminal 27. The lower-side terminal 27 allows the main body apparatus 2 to communicate with a cradle. In the present example, the lower-side terminal 27 is a USB connector (more specifically, a female connector). When the unified apparatus or the main body apparatus 2 alone is placed on the cradle, the game system 1 can display, on a stationary monitor, an image that is generated and output by the main body apparatus 2. Also, in the present example, the cradle has the function of charging the unified apparatus or the main body apparatus 2 alone, being placed thereon. The cradle also functions as a hub device (specifically, a USB hub).

FIG. 4 illustrates six orthogonal views of an example of the left controller 3. As illustrated in FIG. 4, the left controller 3 includes a housing 31. In the present example, the housing 31 has a vertically long shape, e.g., is shaped to be long in an up-down direction (i.e., a y-axis direction illustrated in FIGS. 1 and 4). In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly the left hand. Further, the left controller 3 can also be held in the orientation in which the left controller 3 is horizontally long. When held in the orientation in which the left controller 3 is horizontally long, the left controller 3 may be held with both hands.

The left controller 3 includes an analog stick 32. As illustrated in FIG. 4, the analog stick 32 is provided on a main surface of the housing 31. The analog stick 32 can be used as a direction input section with which a direction can be input. The user tilts the analog stick 32 and thereby can input a direction corresponding to the direction of the tilt (and input a magnitude corresponding to the angle of the tilt). It should be noted that the left controller 3 may include a directional pad, a slide stick that allows a slide input, or the like as the direction input section, instead of the analog stick. Further, in the present example, it is possible to provide an input by pressing the analog stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "−" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

The left controller 3 also includes a terminal 42 that enables wired communication between the left controller 3 and the main body apparatus 2.

FIG. 5 illustrates six orthogonal views of an example of the right controller 4. As illustrated in FIG. 5, the right controller 4 includes a housing 51. In the present example, the housing 51 has a vertically long shape, e.g., is shaped to be long in the up-down direction. In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes an analog stick 52 as a direction input section. In the present example, the analog stick 52 has the same configuration as that of the analog stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, the right controller 4 includes a terminal 64 for allowing the right controller 4 to perform wired communication with the main body apparatus 2.

FIG. 6 is a block diagram illustrating an example of an internal configuration of the main body apparatus 2. The main body apparatus 2 includes components 81 to 91, 97, and 98 illustrated in FIG. 6 in addition to the components illustrated in FIG. 3. Some of the components 81 to 91, 97, and 98 may be implemented as electronic parts on an electronic circuit board, which is contained in the housing 11.

The main body apparatus 2 includes a processor 81. The processor 81 is an information processor for executing various types of information processing to be executed by the main body apparatus 2. For example, the CPU 81 may include only a central processing unit (CPU), or may be a system-on-a-chip (SoC) having a plurality of functions such as a CPU function and a graphics processing unit (GPU) function. The processor 81 executes an information processing program (e.g., a game program) stored in a storage section (specifically, an internal storage medium such as a flash memory 84, an external storage medium that is attached to the slot 23, or the like), thereby executing the various types of information processing.

The main body apparatus 2 includes a flash memory 84 and a dynamic random access memory (DRAM) 85 as examples of internal storage media built in itself. The flash memory 84 and the DRAM 85 are connected to the CPU 81. The flash memory 84 is mainly used to store various data (or programs) to be saved in the main body apparatus 2. The DRAM 85 is used to temporarily store various data used in information processing.

The main body apparatus 2 includes a slot interface (hereinafter abbreviated to "I/F") 91. The slot I/F 91 is connected to the processor 81. The slot I/F 91 is connected to the slot 23, and reads and writes data from and to a predetermined type of storage medium (e.g., a dedicated memory card) attached to the slot 23, in accordance with commands from the processor 81.

The processor 81 reads and writes, as appropriate, data from and to the flash memory 84, the DRAM 85, and each of the above storage media, thereby executing the above information processing.

The main body apparatus 2 includes a network communication section 82. The network communication section 82 is connected to the processor 81. The network communication section 82 communicates (specifically, through wireless communication) with an external apparatus via a network. In the present example, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined communication method (e.g., communication based on a particular protocol or infrared light communication). It should be noted that the wireless communication in the above second communication form achieves the function of allowing so-called "local communication", in which the main body apparatus 2 can wirelessly communicate with another main body apparatus 2 located in a closed local network area, and the plurality of main body apparatuses 2 directly communicate with each other to exchange data.

The main body apparatus 2 includes a controller communication section 83. The controller communication section 83 is connected to the processor 81. The controller communication section 83 wirelessly communicates with the left controller 3 and/or the right controller 4. The main body apparatus 2 may communicate with the left and right controllers 3 and 4 using any suitable communication method. In the present example, the controller communication section 83 performs communication with the left and right controllers 3 and 4 in accordance with the Bluetooth (registered trademark) standard.

The processor 81 is connected to the left-side terminal 17, the right-side terminal 21, and the lower-side terminal 27. When performing wired communication with the left controller 3, the processor 81 transmits data to the left controller 3 via the left-side terminal 17 and also receives operation data from the left controller 3 via the left-side terminal 17. Further, when performing wired communication with the right controller 4, the processor 81 transmits data to the right controller 4 via the right-side terminal 21 and also receives operation data from the right controller 4 via the right-side terminal 21. Further, when communicating with the cradle, the processor 81 transmits data to the cradle via the lower-side terminal 27. As described above, in the present example, the main body apparatus 2 can perform both wired communication and wireless communication with each of the left and right controllers 3 and 4. Further, when the unified apparatus obtained by attaching the left and right controllers 3 and 4 to the main body apparatus 2 or the main body apparatus 2 alone is attached to the cradle, the main body apparatus 2 can output data (e.g., image data or sound data) to a stationary monitor or the like via the cradle.

Here, the main body apparatus 2 can communicate with a plurality of left controllers 3 simultaneously (or in parallel). Further, the main body apparatus 2 can communicate with a plurality of right controllers 4 simultaneously (or in parallel). Thus, a plurality of users can simultaneously provide inputs to the main body apparatus 2, each using a set of left and right controllers 3 and 4. As an example, a first user can provide an input to the main body apparatus 2 using a first set of left and right controllers 3 and 4, and at the same time, a second user can provide an input to the main body apparatus 2 using a second set of left and right controllers 3 and 4.

Further, the display 12 is connected to the processor 81. The processor 81 displays, on the display 12, a generated image (e.g., an image generated by executing the above information processing) and/or an externally obtained image.

The main body apparatus 2 includes a codec circuit 87 and speakers (specifically, a left speaker and a right speaker) 88. The codec circuit 87 is connected to the speakers 88 and an audio input/output terminal 25 and also connected to the processor 81. The codec circuit 87 is for controlling the input and output of audio data to and from the speakers 88 and the sound input/output terminal 25.

The main body apparatus 2 includes a power control section 97 and a battery 98. The power control section 97 is connected to the battery 98 and the processor 81. Further, although not illustrated, the power control section 97 is connected to components of the main body apparatus 2 (specifically, components that receive power supplied from the battery 98, the left-side terminal 17, and the right-side terminal 21). Based on a command from the processor 81, the power control section 97 controls the supply of power from the battery 98 to each of the above components.

Further, the battery 98 is connected to the lower-side terminal 27. When an external charging device (e.g., the cradle) is connected to the lower-side terminal 27, and power is supplied to the main body apparatus 2 via the lower-side terminal 27, the battery 98 is charged with the supplied power.

FIG. 7 is a block diagram illustrating examples of the internal configurations of the main body apparatus 2, the left controller 3, and the right controller 4. It should be noted that the details of the internal configuration of the main body apparatus 2 are illustrated in FIG. 6 and therefore are omitted in FIG. 7.

The left controller 3 includes a communication control section 101, which communicates with the main body apparatus 2. As illustrated in FIG. 7, the communication control section 101 is connected to components including the terminal 42. In the present example, the communication control section 101 can communicate with the main body apparatus 2 through both wired communication via the terminal 42 and wireless communication without via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the analog stick ("stick" in FIG. 7) 32. Each of the buttons 103 and the analog stick 32 outputs information regarding an operation performed on itself to the communication control section 101 repeatedly at appropriate timing.

The communication control section 101 acquires information regarding an input (specifically, information regarding an operation or the detection result of the sensor) from each of input sections (specifically, the buttons 103 and the analog stick 32). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the analog stick 32 based on the operation data.

The left controller 3 includes a power supply section 108. In the present example, the power supply section 108 includes a battery and a power control circuit. Although not illustrated in FIG. 7, the power control circuit is connected to the battery and also connected to components of the left controller 3 (specifically, components that receive power supplied from the battery).

As illustrated in FIG. 7, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, a communication control section 111 can communicate with the main body apparatus 2 through both wired communication via the terminal 64 and wireless communication without via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113, and the analog stick 52. These input sections have functions similar to those of the input sections of the left controller 3 and operate similarly to the input sections of the left controller 3.

The right controller 4 includes a power supply section 118. The power supply section 118 has a function similar to that of the power supply section 108 of the left controller 3 and operates similarly to the power supply section 108.

As described above, in the game system 1 of the present example, the left controller 3 and the right controller 4 are removable from the main body apparatus 2. In addition, when the unified apparatus obtained by attaching the left controller 3 and the right controller 4 to the main body apparatus 2 or the main body apparatus 2 alone is attached to the cradle, an image (and sound) can be output on an external display device, such as a stationary monitor or the like. The game system 1 will be described below according to an embodiment in which an image is displayed on the display 12. It should be noted that in the case where the game system 1 is used in an embodiment in which an image is displayed on the display 12, the game system 1 may be used with the left controller 3 and the right controller 4 attached to the main body apparatus 2 (e.g., the main body apparatus 2, the left controller 3, and the right controller 4 are integrated in a single housing).

A game is played using a virtual space displayed on the display 12, according to operations performed on the operation buttons and sticks of the left controller 3 and/or the right controller 4, or touch operations performed on the touch panel 13 of the main body apparatus 2, in the game system 1. In the present example, as an example, a game can be played in which a player character PC is moved on a field in a virtual space according to the user's operation performed using the operation buttons, the sticks, and the touch panel 13.

An image blurring process that is performed in the game system 1 will be outlined with reference to FIGS. 8 to 18. It should be noted that FIG. 8 is a diagram illustrating an example of a virtual space which is displayed on the display 12 when viewed from above. FIG. 9 is a diagram for describing an example of a location and orientation of a virtual camera disposed in a virtual space. FIG. 10 is a diagram illustrating an example of an image of a virtual space captured by a virtual camera that is aimed in a horizontal direction in a virtual space. FIG. 11 is a diagram illustrating an example of an image of a virtual space captured by a virtual camera that is aimed in a diagonally downward direction in a virtual space. FIG. 12 is a diagram illustrating an example of an image of a virtual space captured by a virtual camera that is aimed in a directly downward direction in a virtual space. FIG. 13 is a diagram illustrating an example of a relationship between a depth distance from a virtual camera and the degree of blurring. FIG. 14 is a diagram illustrating an example of a relationship between the imaging direction of a virtual camera and a far view blur start distance. FIG. 15 is a diagram illustrating an example of a relationship between the imaging direction of a virtual camera and a far view blur transition width. FIG. 16 is a diagram illustrating an example of a relationship between the imaging direction of a virtual camera and a near view blur end distance. FIG. 17 is a diagram illustrating an example of a relationship between the imaging direction of a virtual camera and a near view blur transition width. FIG. 18 is a diagram illustrating another example of a relationship between a depth distance from a virtual camera and the degree of blurring.

In FIGS. 8 and 9, a player character PC and a plurality of virtual objects OBJ are disposed on a field (reference plane RP) in a virtual space. Here, the reference plane RP is set as a horizontal plane in the virtual space. It should be noted that a field in a virtual space may be formed in the same horizontal plane as the reference plane RP as illustrated in FIGS. 8 and 9, or may be the reference plane RP in which roughness is formed.

In the example of FIGS. 8 and 9, a player character PC and four virtual objects OBJ1 to OBJ4 are disposed on the field. In the present example, not only the virtual object OBJ1, OBJ2, and OBJ4 are disposed in contact with the field (the reference plane RP), but also the virtual object OBJ3 and the player character PC are assumed to be disposed on the field, although the virtual object OBJ3 and the player character PC are actually disposed away from the field. The player character PC is moved on the field in the virtual space according to the user's operation (e.g., an operation of tilting the left stick 32). It should be noted that other characters that are moved in the virtual space under automatic control of the processor 81 according to a predetermined algorithm or the like may also be disposed on the field.

In the present example, an image captured by the virtual camera disposed in the virtual space is displayed on the display 12. In the present example, a location and/or direction of the virtual camera are changed such that a location of interest in the virtual space (e.g., the center-of-gravity location of the player character PC, a location of the player character PC's foot, or a location on the field in front of or behind the player character PC) is a gaze point. The location and direction of the virtual camera can also be changed, depending on the user's predetermined operation (e.g., an operation of tilting the stick 32 or 52). It should be noted that the location of interest may be the same as or different from the gaze point. In the description that follows, it is assumed that the location of interest is the same as the gaze point.

For example, as illustrated in FIG. 9, the imaging direction of the virtual camera, which captures an image of the virtual space, can be changed, depending on the user's operation (e.g., an operation of tilting the right stick 52). Specifically, the virtual camera can be changed, depending on the user's operation from the location and direction (hereinafter referred to as a horizontal orientation) of the virtual camera where the location of interest is the gaze point and the horizontal direction in the virtual space is the imaging direction to the location and direction (hereinafter referred to as a downward view orientation) of the virtual camera where the location of interest is the gaze point and the directly downward direction in which the virtual space is viewed from above is the imaging direction. It should be noted that in the present example, the location and direction of the virtual camera can also be changed to the location and direction (hereinafter referred to as an intermediate orientation) of the virtual camera where the location of interest is the gaze point and a direction in which the virtual space is viewed diagonally from above is the imaging direction, which are an intermediate location and direction of the virtual camera between the horizontal orientation and the downward view orientation. Thus, the virtual camera can be controlled such that the virtual space can be viewed at any angle according to the user's operation.

It should be noted that the depth distance of the virtual camera to the location of interest (gaze point) may be changed, depending on the imaging direction, or alternatively, may be invariable. As an example, in the former case, the location of the virtual camera may be controlled such that the depth distance increases with an increase in an angle difference between a direction in which the reference plane RP extends (a direction parallel to the reference plane RP) and the imaging direction. In that case, the virtual camera is set as a near camera for which the depth distance between the virtual camera and the gaze point is relatively short when the virtual camera is in the horizontal orientation, as a far camera for which the depth distance between the virtual camera and the gaze point is relatively long when in the downward view orientation, and as a middle camera for which the depth distance between the virtual camera and the gaze point is an intermediate distance when in the intermediate orientation. Thus, by changing the depth distance to the location of interest (gaze point) is changed, depending on the imaging direction of the virtual camera, when a number of game objects are disposed on the field (the reference plane RP) of the virtual space, an image having a nearer view of game objects can be formed with a number of game objects on the field included in the range of view by viewing near to far areas from the virtual camera when the virtual camera is in the horizontal orientation. In addition, even when the virtual camera is in the downward view orientation, an image of the virtual space captured from above in which a number of game objects on the field are in the range of view can be generated by changing the depth distance.

As illustrated in FIG. 10, the four virtual objects OBJ1 to OBJ4 and the player character PC are disposed and displayed in the range of view of the virtual camera when the virtual camera is in the horizontal orientation. Specifically, the virtual object OBJ1, the virtual object OBJ2, the virtual object OBJ3, and the virtual object OBJ4 are disposed in order of proximity to the virtual camera, and the player character PC is disposed and displayed on the virtual object OBJ2. The location of interest is also set at the player character PC (e.g., the center-of-gravity location), and an image that is in focus with the location of interest being the gaze point is displayed.

In the present example, an image process of blurring and rendering a captured image with a degree of blurring depending on the depth distance from the virtual camera. Here, the degree of blurring is a parameter that indicates how much an image is blurred in a process in which an image in a proximate range around the depth distance of the focal point of the virtual camera is not blurred or is less blurred, and an image further (far view) or nearer (near view) than the proximate range is more blurred. As an example, a clear image obtained by imaging the inside of the range of view of the virtual camera with substantially all thereof in focus (the virtual camera is in focus in the entire range of view), and a blurred image obtained by imaging with a blur occurring in the range of view (a blur occurs in the entire range of view with a predetermined degree of blurring), are generated. Thereafter, an image that is to be displayed on the display 12 is generated by mixing (combination (e.g., alpha combination) at a blend ratio for each pixel), at a blend ratio of each pixel depending on the degree of blurring determined based on the depth distance (z-value (depth value)) of the location of that pixel from the virtual camera, the value of the pixel corresponding to the clear image and the value of the pixel corresponding to the blurred image. Specifically, the value of a pixel at a location (x, y) is as follows:

$$\text{Pixel value } (x,y) = \text{the pixel value } (x,y) \text{ of a clear}$$
$$\text{image} \times \alpha(x,y) + \text{the pixel value } (x,y) \text{ of a blurred}$$
$$\text{image} \times (1-\alpha(x,y))$$

where $\alpha(x, y)$ represents a blend ratio based on the degree of blurring that is dynamically determined, depending on the depth distance of a pixel location (x, y) in the virtual space. The blend ratio $\alpha$ at each depth distance is determined based on a blurring degree profile for the depth distance described below. Specifically, rendering is performed with a range nearer the virtual camera and a range further from the virtual camera than a depth distance range including a focal point location that is displayed without a blur (a depth distance range around the gaze point) being blurred with the degree of blurring depending on the depth distance.

It should be noted that in the above image process, a far view blurring process of blurring an image (far view) of a range further than the proximate range, and a near view blurring process of blurring an image (near view) of a range nearer than the proximate range, may be performed separately. In that case, a far view-blurred image that is generated by imaging with a blur occurring in the range of view due to far view blurring (a blur occurs in the entire range of view due to far view blurring with a predetermined degree of blurring), and a near view-blurred image that is generated by imaging with a blur occurring in the range of view due to near view blurring (a blur occurs in the entire range of view due to near view blurring with a predetermined degree of blurring). Thereafter, for example, a pixel value of an intermediate image subjected to far view blurring is calculated as follows:

$$\text{The pixel value } (x,y) \text{ of an intermediate image} = \text{the}$$
$$\text{pixel value } (x,y) \text{ of a clear image} \times \alpha 1(x,y) + \text{the}$$
$$\text{pixel value } (x,y) \text{ of a far view-blurred image} \times$$
$$(1-\alpha 1(x,y))$$

Furthermore, a pixel value of a final image subjected to near view blurring is calculated as follows:

The pixel value $(x,y)$ of a final image=the pixel
value $(x,y)$ of an intermediate image$\times\alpha2(x,y)+$
the pixel value $(x,y)$ of a near view-blurred
image$\times(1-\alpha2(x,y))$ where $\alpha1(x, y)$ represents a blend ratio based on the degree of blurring of far view blurring that is dynamically determined, depending on the depth distance of a pixel location $(x, y)$ in the virtual space, and $\alpha2(x, y)$ represents a blend ratio based on the degree of blurring of near view blurring that is dynamically determined, depending on the depth distance of a pixel location $(x, y)$ in the virtual space. The blend ratios $\alpha1$ and $\alpha2$ at each depth distance are each determined based on a blurring degree profile for the depth distance described below.

For example, in the example of FIG. 10, the player character PC, which is at a location of interest, and the virtual objects OBJ2 and OBJ3 are disposed in a depth distance range that is displayed without a blur, and are each displayed without a blur. Meanwhile, the virtual object OBJ1 is disposed in a range nearer the virtual camera than the depth distance range that is displayed without a blur, and is rendered in a near view-blurred state (the blurred state is represented by a dashed line in the figure). The virtual object OBJ4 is disposed in a range further from the virtual camera than the depth distance range that is displayed without a blur, and is rendered in a far view-blurred state.

In the present example, the depth-of-field range of the virtual camera is changed based on the imaging direction of the virtual camera in the virtual space. For example, for the location of the virtual camera, the degree of blurring for a depth distance (hereinafter referred to as a second distance) longer than a depth distance (hereinafter referred to as a first distance) in a depth distance range that is displayed without a blur is changed and decreased based on the imaging direction. As an example, the degree of blurring is changed and decreased for the second distance with a decrease in the angle difference between the horizontal direction in the virtual space and the imaging direction of the virtual camera (i.e., with an increase in the closeness of the virtual camera to the horizontal orientation).

In addition, for example, the degree of blurring for a depth distance (hereinafter referred to as a third distance) from the virtual camera shorter than the first distance is changed and decreased based on the imaging direction. As an example, the degree of blurring is changed and decreased for the third distance with a decrease in the above angle difference (i.e., with an increase in the closeness of the virtual camera to the horizontal orientation).

In addition, as illustrated in FIG. 11, when the imaging direction of the virtual camera is changed from the horizontal orientation to the intermediate orientation, the three virtual objects OBJ1 to OBJ3 and the player character PC are disposed and displayed in the range of view of the virtual camera. As in the image of FIG. 10 obtained with the virtual camera in the horizontal orientation, the location of interest is set at the player character PC, and an image that is in focus with the location of interest being the gaze point is displayed.

In addition, in the example of FIG. 11, the player character PC, which is at a location of interest, and the virtual object OBJ2 are disposed in a depth distance range that is displayed without a blur, and are each displayed without a blur, and the virtual object OBJ3 is rendered in a far view-blurred state. This is because due to a change in the depth of field caused by a change in the imaging direction of the virtual camera, the location of the virtual object OBJ3 is changed from the depth distance range that is displayed without a blur to a range that is further from the virtual camera than the depth distance range. In other words, when the virtual camera is changed from the horizontal orientation to the intermediate orientation, the angle difference between the horizontal direction in the virtual space and the imaging direction of the virtual camera increases, and therefore, for the location of the virtual camera, the degree of blurring is changed and increased when the virtual object OBJ3 is displayed, which is disposed at the second distance, which is longer than the first distance, which is in the depth distance range that is displayed without a blur. It should be noted that as described above, when the imaging direction of the virtual camera is changed from the horizontal orientation to the intermediate orientation, the distance between the virtual camera and the gaze point may be increased. Even when the distance between the virtual camera and the gaze point is not changed, the virtual object OBJ3 is rendered in a far view-blurred state. In other words, in the present example, even if, when the imaging direction of the virtual camera is changed from the horizontal orientation to the intermediate orientation, the distance between the virtual camera and the gaze point is not changed, the virtual object OBJ3 is rendered in a far view-blurred state due to a change in depth of field caused by a change in the imaging direction of the virtual camera.

In addition, as illustrated in FIG. 12, when the imaging direction of the virtual camera is further changed from the intermediate orientation to the downward view orientation, the two virtual objects OBJ1 and OBJ2 and the player character PC are disposed and displayed in the range of view of the virtual camera. As in the image of FIG. 11 obtained with the virtual camera in the intermediate orientation, the location of interest is set at the player character PC, and an image that is in focus with the location of interest being the gaze point is displayed.

In the example of FIG. 12, in the depth distance range that is displayed without a blur, the player character PC, which is at a location of interest, is disposed and displayed without a blur, upper portions of the virtual objects OBJ1 and OBJ2 are displayed without a blur, and a lower portion of the virtual object OBJ2 is displayed in a far view-blurred state. This is because due to a further change in depth of field caused by a change in the imaging direction of the virtual camera, the lower portion of the virtual object OBJ2 that is disposed at a slightly lower location in the vicinity of the virtual object OBJ2 is also set from the depth distance range that is displayed without a blur into a range that is further from the virtual camera than the inside of the depth distance range. In addition, when other objects or characters are disposed at a location similar to that of the lower portion of the virtual object OBJ2, these objects or characters are also rendered in a far view-blurred state. In other words, when the virtual camera is changed from the intermediate orientation to the downward view orientation, so that the angle difference between the horizontal direction in the virtual space and the imaging direction of the virtual camera is increased, the degree of blurring is changed and increased when the virtual object OBJ2 is displayed, which is disposed at the second distance, which is further from the virtual camera than the first distance, which is in the depth distance range that is displayed without a blur. It should be noted that as described above, when the imaging direction of the virtual camera is changed from the intermediate orientation to the downward view orientation, the distance between the virtual camera and the gaze point may be increased. Even when the distance between the virtual camera and the gaze point is not changed, the lower portion of the virtual object OBJ2 is rendered in a far view-blurred state. In other words, in the present example, even if, when the imaging direction of the virtual camera is changed from the intermediate orientation to the downward view orientation, the distance between the virtual camera and the gaze point is not changed, the lower portion of the virtual object OBJ2 is rendered in a far view-blurred state due to a change in depth of field caused by a change in the imaging direction of the virtual camera.

Thus, in the present example, the depth distance range in which rendering is performed without a blur to provide a clear image, and the depth distance range in which rendering is performed so as to provide a blurred image, are determined, depending on at least the imaging direction of the virtual camera.

As an example, when a captured image is obtained with the virtual camera in the downward view orientation, a depth distance range Ra2-Ra3 that is located around a depth distance R0 of a location of interest (gaze point) where the focal point is set and in which rendering is performed without a blur is set, and the degree of blurring is continuously changed in each of a depth distance range Ra1-Ra2 (near transition) and a depth distance range Ra3-Ra4 (far transition), which are continuous to the depth distance range Ra2-Ra3, as illustrated by a blurring degree profile indicated by the dashed line of FIG. 13. Such a blurring degree profile for the downward view orientation is defined by the reference depth distance R0, a far view blur transition start distance Ra3, a far view blur transition end distance Ra4, a near view blur transition start distance Ra1, and a near view blur transition end distance Ra2. Here, the reference depth distance R0 corresponds to a depth distance in the virtual space corresponding to the location of interest (gaze point).

In addition, when a captured image is obtained with the virtual camera in the horizontal orientation, a depth distance range Rb2-Rb3 that is located around a depth distance R0 of a location of interest (gaze point) at which the focal point is set and in which rendering is performed without a blur is set, and the degree of blurring is continuously changed in each of a depth distance range (near transition) Rb1-Rb2 and a depth distance range (far transition) Rb3-Rb4, which are continuous to the depth distance range Rb2-Rb3, as in a blurring degree profile represented by the solid line of FIG. 13. Such a blurring degree profile for the horizontal orientation is defined by the reference depth distance R0, a far view blur transition start distance Rb3, a far view blur transition end distance Rb4, a near view blur transition start distance Rb1, and a near view blur transition end distance Rb2. It should be noted that in the example of FIG. 13, the depth distance range Ra1-Ra2 and the depth distance range Rb1-Rb2 have the same size, and the depth distance range Ra3-Ra4 and the depth distance range Rb3-Rb4 have the same size. Alternatively, these depth distance ranges may have the same or different size.

The blurring degree profile based on the imaging direction of the virtual camera is set based on the size of the depth distance range in which rendering is performed without a blur, and the sizes of the near view blur range and/or the far view blur range that extend from the blur transition start distance to the blur transition end distance and in which the degree of blurring is changed. By using such a blurring degree profile, a range nearer the virtual camera, and a range further from the virtual camera than the depth distance range that includes a focal point location and in which displaying is performed without a blur, are rendered in a blurred state with the degree of blurring depending on the depth distance. As can be seen from FIG. 13, the degree of blurring for a depth distance Rx that is further from the virtual camera than the depth distance ranges Ra2-Ra3 and Rb2-Rb3, which include the reference depth distance R0 (first distance), decreases with a decrease in the angle difference (i.e., smaller when the virtual camera is in the horizontal orientation than when in the downward view orientation). The degree of blurring for a depth distance Ry that is nearer the virtual camera than the depth distance ranges Ra2-Ra3 and Rb2-Rb3, which include the reference depth distance R0 (first distance), decreases with a decrease in the angle difference (i.e., smaller when the virtual camera is in the horizontal orientation than when in the downward view orientation). It should be noted that the depth distance Rx is an example of the second distance, and in the example of FIG. 13, any other distances between the far view blur transition start distance Ra3 and the far view blur transition end distance Rb4 are an example of the second distance. The depth distance Ry is an example of the third distance, and in the example of FIG. 13, any other distances between the near view blur transition start distance Rb1 and the near view blur transition end distance Ra2 are an example of the third distance.

For example, a far view blur transition start distance (e.g., the far view blur transition start distances Ra3 and Rb3 in FIG. 13) in a blurring degree profile is calculated using a relationship expression illustrated in FIG. 14. As can be seen from that relation expression, a blurring degree profile is set in which the far view blur transition start distance increases with an increase in the closeness of the imaging direction of the virtual camera to the horizontal direction in the virtual space (with a decrease in the angle difference). As a result, the far view blur transition start distance increases with an increase in the closeness of the imaging direction of the virtual camera to the horizontal direction, so that an image of the virtual space that covers a far and wide area can be displayed.

In addition, a far view blur transition width (far transition; e.g., the depth distance ranges Ra3-Ra4 and Rb3-Rb4 of FIG. 13) in a blurring degree profile is calculated using a relation expression illustrated in FIG. 15. As can be seen from that relation expression, a blurring degree profile is set in which the far view blur transition width increases with an increase in the closeness of the imaging direction of the virtual camera to the horizontal direction in the virtual space (with a decrease in the angle difference). When the imaging direction of the virtual camera is close to the horizontal direction in the virtual space, the far view blur start distance is increased, so that a feeling of distance in the virtual space may change abruptly even when a depth location slightly changes at a depth distance in the vicinity of the far view blur start distance. However, when the imaging direction is close to the horizontal direction, the abrupt change in a far view blur can be reduced by setting a great far view blur transition width.

In addition, a near view blur transition end distance (e.g., the near view blur transition end distances Ra2 and Rb2 of FIG. 13) in a blurring degree profile is calculated using a relation expression illustrated in FIG. 16. As can be seen from that relation expression, a blurring degree profile is set in which the near view blur transition end distance decreases with an increase in the closeness of the imaging direction of the virtual camera to the horizontal direction in the virtual space (with a decrease in the angle difference). As a result, the near view blur transition end distance decreases with an increase in the closeness of the imaging direction of the virtual camera to the horizontal direction. Therefore, even when a number of characters, such as a player character PC and other characters, are disposed at a location closer to the virtual camera than the focal length, a near view blur can be prevented from occurring for most of the characters.

In addition, a near view blur transition width (near transition; e.g., the depth distance ranges Ra1-Ra2 and Rb1-Rb2 of FIG. 13) in a blurring degree profile is calculated using a relation expression illustrated in FIG. 17. As can be seen from that relation expression, a blurring degree profile is set in which the near view blur transition width increases with an increase in the closeness of the imaging direction of the virtual camera to the downward view direction in the virtual space (with an increase in the angle difference). When the imaging direction of the virtual camera is close to the downward view direction in the virtual space, the near view blur transition start distance is increased, so that at a depth distance in the vicinity of the near view blur transition start distance, a depth location may change abruptly between a location on an image and a slightly higher location on the image, so that the degree of blurring may change abruptly, and therefore, a noticeable boundary may be likely to occur between a blurred portion and an unblurred portion. However, when the imaging direction is close to the downward view direction in the virtual space, an abrupt change in a near view blur can be reduced by setting a great near view blur transition width.

It should be noted that in the above examples, a blurring degree profile based on the imaging direction of the virtual camera is defined by the far view blur transition start distance Rb3, the far view blur transition end distance Rb4, the near view blur transition start distance Rb1, and the near view blur transition end distance Rb2, thereby changing the size of the depth distance range in which rendering is performed without a blur and the sizes of the near view blur transition width and/or the far view blur transition width that extend from the blur transition start distance to the blur transition end distance and in which the degree of blurring is changed. Alternatively, at least one of these parameters may be changed based on the imaging direction. In addition, a blurring degree profile may be changed based on the imaging direction by changing other parameters.

For example, in a blurring degree profile illustrated in FIG. 18, depth distance ranges Ra2-Ra3 and Rb2-Rb3 in which rendering is performed without a blur when the virtual camera are in the horizontal orientation and the downward view orientation are the same, and a variation in the degree of blurring per unit distance in a range in which the degree of blurring is changed (a near view blur transition width/a far view blur transition width) is the same. Meanwhile, the maximum value of the degree of blurring of a blurring degree profile for the downward view orientation is set greater than the maximum value of the degree of blurring of a blurring degree profile for the horizontal orientation, whereby the blurring degree profiles are each changed. Even when the blurring degree profiles are changed in such a manner, the degree of blurring for a depth distance Rx that is further from the virtual camera than the depth distance range Ra2-Ra3 (Rb2-Rb3), which includes the reference depth distance R0 (first distance), decreases with a decrease in the angle difference (i.e., smaller when the virtual camera is in the horizontal orientation than when in the downward view orientation). In addition, the degree of blurring for a depth distance Ry that is nearer the virtual camera than the depth distance range Ra2-Ra3 (Rb2-Rb3), which includes the reference depth distance R0 (first distance), decreases with a decrease in the angle difference (i.e., smaller when the virtual camera is in the horizontal orientation than when in the downward view orientation). Therefore, even when such blurring degree profiles are used, an effect similar to that of the above blurring degree profiles can be obtained. Although the depth distance Rx is an example of the second distance, any other distances that are greater than the distance at which the degree of blurring for the horizontal orientation becomes greater than the degree of blurring for the downward view orientation halfway through the far view blur transition width are an example of the second distance in the example of FIG. 18. In addition, although the depth distance Ry is an example of the third distance, any other distances that are smaller than the distance at which the degree of blurring for the horizontal orientation becomes equal to the degree of blurring for the downward view orientation halfway through the far view blur transition width are an example of the third distance in the example of FIG. 18.

It should be noted that the above blurring degree profiles and the relation expressions of the parameters are only for illustrative purposes. Other profiles and relation expressions based on a distance from the virtual camera or the imaging direction of the virtual camera may be used. For example, for the above blurring degree profiles and the relation expressions of the parameters, different relation expressions may be set for different ranges of the distance or imaging direction, or a relation expression represented by a linear function, quadratic, or polynomial function may be included.

In addition, the location of interest where a display image is in focus may be a location in the virtual space corresponding to a display location that is the center of a display screen, or a location in the virtual space corresponding to a display location that is offset from the center in any direction. In that case, the location of interest may be a location inside or at a surface of the player character PC, a location at a foot of the player character PC or on a field around the player character PC, or a location based on a location where another character or object is disposed. In addition, the location of interest may or may not coincide with the gaze point of the virtual camera.

In addition, the above reference plane RP may be inclined with respect to the horizontal direction in the virtual space. As an example, a player character PC and a plurality of virtual objects OBJ may be disposed on an inclined field (inclined reference plane RP) in the virtual space. In that case, an orientation of the virtual camera that is parallel to a direction in which the reference plane RP extends corresponds to the "horizontal orientation" of the virtual camera in the above graph, an orientation of the virtual camera that is perpendicular to a direction in which the reference plane RP extends corresponds to the "downward view orientation" of the virtual camera in the above graph, and the intermediate orientation of the virtual camera corresponds to an orientation in which the virtual camera views the reference plane RP in an imaging direction between those two orientations.

Furthermore, the above reference plane RP may be a vertical plane in the virtual space. As an example, in the case of a game including falling movement in a directly downward direction in the virtual space, it is considered that a far view blur (and a near view blur) is decreased with an increase in the closeness of the imaging direction to that movement direction. Specifically, in that case, the above image blurring process is performed, assuming that an orientation of the virtual camera that is parallel to a direction in which the reference plane RP that is a vertical plane in the virtual space extends corresponds to the "horizontal orientation" of the virtual camera in the above graph, an orientation of the virtual camera that is perpendicular to a direction in which the reference plane RP that is the vertical plane extends corresponds to the "downward view orientation" of the virtual camera in the above graph, and that process is performed, assuming that the intermediate orientation of the virtual camera corresponds to an orientation in which the reference plane RP is viewed in an imaging direction between those two changed orientations.

In addition, when the virtual camera is in the horizontal orientation, the imaging direction of the virtual camera may not be exactly the same as the horizontal direction in the virtual space, and may have some angle of depression with respect to the horizontal direction, which is a direction in which the reference plane RP extends. In addition, when the virtual camera is in the downward view orientation, the imaging direction of the virtual camera may not be exactly the same as the vertical direction in the virtual space, and may deviate, by some angle, from a direction perpendicular to the horizontal direction, which is a direction in which the reference plane RP extends.

In addition, in the present example, a change in the imaging direction of the virtual camera is not limited only to the above change in the angle of elevation or depression of the virtual camera, and includes a change in the imaging direction depending on the rotation of the virtual camera about the vertical axis of the virtual space. In other words, in the present example, not only an image that is blurred with the degree of blurring depending on a change in the angle of elevation or depression of the imaging direction of the virtual camera, but also an image that is blurred with the degree of blurring depending on a change in the azimuth angle of the imaging direction of the virtual camera, may be displayed. As an example, in a situation that there are a large number of virtual objects on the land side of a coast in the virtual space and a small number of virtual objects on the sea side, if a virtual camera is disposed at the coast, an image may be displayed with a lower degree of blurring when the imaging direction of the virtual camera is aimed at the land side than when at the sea side.

Figure 23:
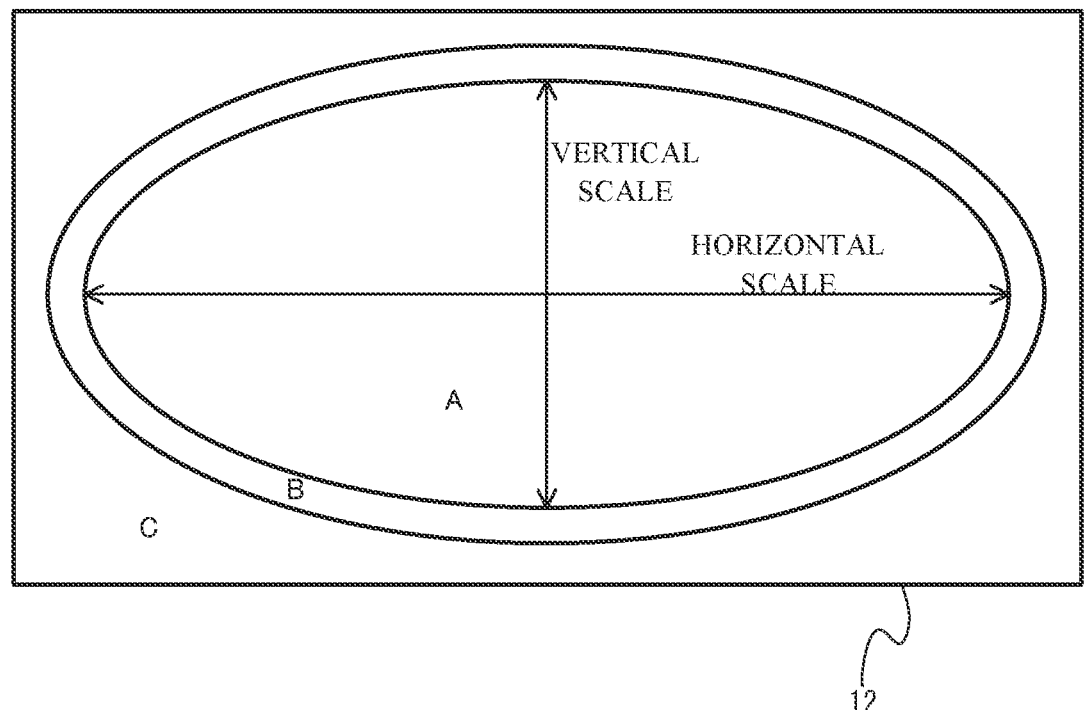
FIG. 23 is a diagram illustrating a non-limiting example of a mask shape that is used in a near view blur masking process and a far view blur masking process.

A masking process performed in the game system 1 will be outlined with reference to FIGS. 19 to 25. It should be noted that FIG. 19 is a diagram illustrating an example of an image of a virtual space captured by a virtual camera that is aimed in a horizontal direction in a virtual space, the image being displayed without a near view blur masking process. FIG. 20 is a diagram illustrating an example of an image of a virtual space captured by a virtual camera that is aimed in a horizontal direction in a virtual space, the image being displayed after being subjected to a near view blur masking process. FIG. 21 is a diagram illustrating an example of an image of a virtual space captured by a virtual camera that is aimed in a directly downward direction in a virtual space, the image being displayed without a far view blur masking process. FIG. 22 is a diagram illustrating an example of an image of a virtual space captured by a virtual camera that is aimed in a directly downward direction in a virtual space, the image being displayed after being subjected to a far view blur masking process. FIG. 23 is a diagram illustrating an example of a mask shape that is used in a near view blur masking process and a far view blur masking process. FIG. 24 is a diagram illustrating an example of a relationship between the imaging direction of a virtual camera and the degree of near view blur masking. FIG. 25 is a diagram illustrating an example of a relationship between the imaging direction of a virtual camera and the degree of far view blur masking.

In the present example, a near view blur mask and/or a far view blur mask are used for changing and decreasing the degree of blurring for at least a portion of locations in a display image, based on at least one of the imaging direction of a virtual camera in a virtual space and a distance between the location of interest and the virtual camera. As an example, by using the near view blur mask, the degree of blurring is changed and decreased for at least a portion of locations in a display image with a decrease in the distance between the location of interest and the virtual camera or an increase in the closeness of the imaging direction to the horizontal direction. In addition, by using the far view blur mask, the degree of blurring is changed and decreased for at least a portion of locations in a display image with an increase in the distance between the location of interest and the virtual camera or a decrease in the closeness of the imaging direction to the horizontal direction.

For example, as illustrated in FIG. 19, four virtual objects OBJ1 to OBJ4 and a player character PC are disposed and displayed in the range of view of a virtual camera that is in the horizontal orientation and has a relatively short distance to the location of interest. Specifically, the virtual object OBJ1, the virtual object OBJ2, the virtual object OBJ3, and the virtual object OBJ4 are disposed and displayed in order of proximity to the virtual camera, and the player character PC is disposed and displayed on the virtual object OBJ2. In addition, the location of interest is set on a field in the virtual space at a long depth distance from the virtual camera that is beyond the player character PC, and an image that is in focus with the location of interest being the gaze point is displayed.

For example, in the example of FIG. 19, the virtual object OBJ3 is disposed and displayed without a blur in a depth distance range that is displayed without a blur. Meanwhile, the player character PC and the virtual objects OBJ1 and OBJ2 are disposed in a range nearer the virtual camera than the depth distance range that is displayed without a blur, and are each rendered in a near view-blurred state (the blurred state is represented by a dashed line in the figure). In addition, the virtual object OBJ4 is disposed in a range further from the virtual camera than the depth distance range that is displayed without a blur, and is rendered in a far view-blurred state.

FIG. 20 illustrates an example of an image obtained by subjecting the image of FIG. 19 to the near view blur masking process. For example, as illustrated in FIG. 20, a display image is processed using an elliptical near view blur mask. The display image illustrated in FIG. 20, which is overlaid by the near view blur mask (e.g., the player character PC, a portion of the virtual object OBJ1, and a portion of the virtual object OBJ2 in the near view-blurred state), is rendered without being blurred and without a near view blur, or with a near view blur reduced. Here, the near view blur mask is used to change a blur range of a near view blur or the degree of blurring in the display image. The size, location, degree of masking, and the like of the near view blur mask are changed, depending on at least one of the imaging direction of the virtual camera and the distance between the location of interest and the virtual camera. Although, in the present example, a near view blur may be reduced, i.e., a slight near view blur may occur, at an outer peripheral portion of the near view blur mask (a boundary portion of the near view blur mask), the blurred state of the outer peripheral portion is not illustrated in FIG. 20.

Thus, when the virtual camera is in the horizontal state and/or has a location of interest at a relatively short distance, the masking process using the near view blur mask is performed, and therefore, even when a character such as a player character PC is disposed near the virtual camera, the character can be displayed without a near view blur or with a near view blur reduced. It should be noted that the process described with reference to FIG. 20 involves the near view blur mask, and therefore, even if a portion of the virtual object OBJ4 is displayed in the near view blur mask, a far view blur is present for the virtual object OBJ4, and therefore, the near view blur mask is not applied to the virtual object OBJ4, leaving the far view blur.

In addition, as illustrated in FIG. 21, three virtual objects OBJ1, OBJ2, and OBJ5 and a player character PC are disposed and displayed in the range of view of a virtual camera that is in the downward view orientation and has a location of interest at a relatively long distance. Specifically, the virtual object OBJ5, the virtual object OBJ1, and the virtual object OBJ2 are disposed and displayed in order of proximity to the virtual camera, and the player character PC is disposed and displayed on the virtual object OBJ2.

For example, in the example of FIG. 21, the virtual object OBJ5, which is star-shaped, is disposed in a range nearer the virtual camera than a depth distance range that is displayed without a blur, and is rendered in a near view-blurred state. In addition, the player character PC and the virtual objects OBJ1 and OBJ2 are disposed in a range further from the virtual camera than the depth distance range that is displayed without a blur, and are each rendered in a far view-blurred state.

FIG. 22 illustrates an example of a display image obtained by subjecting the image of FIG. 21 to a far view blur masking process. For example, as illustrated in FIG. 22, a display image is processed using an elliptical far view blur mask. The display image illustrated in FIG. 22, which is overlaid by the far view blur mask (e.g., the player character PC, a portion of the virtual object OBJ1, and a portion of the virtual object OBJ2 in a far view-blurred state), is rendered without being blurred and without a far view blur, or with a far view blur reduced. Here, the far view blur mask is used to change a blur range of a far view blur or the degree of blurring in the display image. The size, location, degree of masking, and the like of the far view blur mask are changed, depending on at least one of the imaging direction of the virtual camera and the distance between the location of interest and the virtual camera.

Thus, when the virtual camera is in the downward view orientation and/or has a location of interest at a relatively far distance, the masking process using the far view blur mask is performed, and therefore, an image can be prevented from being entirely displayed in a far view-blurred state or can be displayed with a far view blur reduced. It should be noted that the process described with reference to FIG. 22 involves the far view blur mask, and therefore, even if a portion of the virtual object OBJ5 is displayed in the far view blur mask, a near view blur is present in the virtual object OBJ5, and therefore, the far view blur mask is not applied to the virtual object OBJ5, leaving the near view blur.

For example, as illustrated in FIG. 23, the near view blur mask and the far view blur mask are set such that the degree of blurring is decreased for each pixel location as the pixel location is closer to the center of a two-dimensional display image displayed on the display 12. For example, the near view blur mask and the far view blur mask are set as elliptical mask texture data (i.e., matrix data) for the entire display image. For the mask texture data, a value of 0 to 1 is set for a B-region that is an outer peripheral portion of the elliptical shape, a value of 1 is set for an A-region that is a main region in the elliptical shape excluding the B-region, and a value of 0 is set for a C-region that is outside the B-region.

The degree of masking for each pixel location in the near view blur mask and the far view blur mask is calculated by multiplying the above value by an opacity described below. The degree of blurring for each pixel location in a display image after the masking process is calculated by "the degree of blurring before the masking process×(1–the degree of masking)". Specifically, the degree of blurring for each pixel location (x, y) is calculated as follows:

$$\text{Degree of blurring } (x,y) = \text{the degree of blurring } (x,y)$$
$$\text{before the masking process} \times (1 - \text{the value } (x,y)$$
$$\text{of the mask texture} \times \text{the opacity})$$

where the opacity is of the mask texture indicating the degree of masking, and is changed, depending on at least one of the imaging direction of the virtual camera and the distance between the location of interest and the virtual camera. Therefore, the degree of blurring for each pixel location in a display image after the masking process is changed, depending on at least one of the imaging direction of the virtual camera and the distance between the location of interest and the virtual camera. In addition, the masking process using the near view blur mask is effective when a near view blur is present at a pixel location before the masking process, and is ineffective for a pixel location at which a far view blur is present before the masking process (i.e., the degree of blurring of a far view blur set at a pixel location before the masking process is maintained). In addition, the masking process using the far view blur mask is effective when a far view blur is present at a pixel location before the masking process, and is ineffective for a pixel location at which a near view blur is present before the masking process (i.e., the degree of blurring of a near view blur set at a pixel location before the masking process is maintained).

For example, the opacity of the near view blur mask is calculated based on at least one of the imaging direction of the virtual camera and the distance between the location of interest and the virtual camera, using a relation expression illustrated in FIG. 24. As can be seen from that relation expression, the opacity is fixed to 1.0, so that a high degree of masking is set, when the virtual camera is in the range between the horizontal orientation (near camera) and the intermediate orientation (middle camera), and the opacity approaches 0.0, so that a decreased degree of masking is set, when the virtual camera is changed from the intermediate orientation (middle camera) toward the downward view orientation (far camera).

In addition, the size and location of the near view blur mask may have a fixed value. For example, the shape of the near view blur mask may be circular, or alternatively, as illustrated in FIG. 23, may be horizontally elongated elliptical with respect to a display image, i.e., the horizontal scale (length) of the near view blur mask has a greater value than that of the vertical scale (height). In addition, the near view blur mask may be set such that the center of a display image coincides with the center of the circular or elliptical shape thereof, or alternatively, may be set at a location offset from a display image in a height or length direction. As an example, the near view blur mask may be set such that the center of the ellipse is located at a somewhat lower location in a display image. The player character PC and characters around the player character PC are often located at a location somewhat lower than the center of a screen when the virtual camera is in the horizontal orientation (e.g., when a near view of an area around the player character PC on the ground is displayed, the area around the player character PC is displayed on a lower side of a screen). Thus, a near view blur can be decreased at a location somewhat lower than the center of a screen, where something important to the progress of a game is relatively often displayed.

In addition, the opacity of the far view blur mask is calculated based on at least one of the imaging direction of the virtual camera and the distance between the location of interest and the virtual camera, using a relation expression illustrated in FIG. 25. As can be seen from that relation expression, the opacity is set to 0.0 when the virtual camera is in the horizontal orientation (near camera), and the opacity approaches 1.0 as the virtual camera is closer to the downward view orientation (far camera), so that the degree of masking is set stronger.

In addition, the length and height of the far view blur mask may be calculated based on at least one of the imaging direction of the virtual camera and the distance between the location of interest and the virtual camera, using a predetermined relation expression. As an example, as the virtual camera is changed from the horizontal orientation (near camera) toward the intermediate orientation (middle camera), the length of the far view blur mask may become longer and the height of the far view blur mask may become shorter. As the virtual camera is changed from the intermediate orientation (middle camera) toward the downward view orientation (far camera), the length of the far view blur mask may become shorter and the height of the far view blur mask may become longer.

In addition, the location of the far view blur mask relative to a display image may be calculated based on based on at least one of the imaging direction of the virtual camera and the distance between the location of interest and the virtual camera, using a predetermined relation expression. As an example, when the virtual camera is in the horizontal orientation (near camera) or in the downward view orientation (far camera), the far view blur mask is not vertically offset, and when the virtual camera is changed toward the intermediate orientation (middle camera), the far view blur mask may be moved and set to a location such that the center of the far view blur mask is offset from the center of a display image in a vertically upward direction.

Thus, in the present example, the near view blur mask is generated such that the degree of the masking process increases with a decrease in the distance between the location of interest and the virtual camera and/or an increase in the closeness of the imaging direction of the virtual camera to the horizontal direction. The far view blur mask is generated such that the degree of the masking process increases with an increase in the distance between the location of interest and the virtual camera and/or a decrease in the closeness of the imaging direction of the virtual camera to the horizontal direction. The degree of blurring is changed such that when the depth distance from the virtual camera is in a range nearer than the depth distance range that is displayed without a blur, the degree of blurring is set greater for a location having a shorter depth distance from the virtual camera, and is set smaller for the greater degree of the masking process indicated by the near view blur mask. In addition, the degree of blurring is changed such that when the depth distance from the virtual camera is in a range further than the depth distance range that is displayed without a blur, the degree of blurring is set greater for a location having a longer depth distance from the virtual camera, and is set smaller for the greater degree of the masking process indicated by the far view blur mask. Thus, mask data for a near view blur and mask data for a far view blur are prepared separately, so that a masking process appropriate for the degree of blurring of each type of blur can be performed, resulting in an improvement in the visibility of a display image.

In the above example, the masking process is performed using the near view blur mask and the far view blur mask. Alternatively, the masking process may be performed using a single mask or three or more masks. For example, in the case where a single mask is used, a similar masking process can be performed by using a mask that decreases the degree of blurring for both of a near view blur and a far view blur or that avoids blurring. In addition, in the case where three masks are used, the above near view blur mask and a far view blur mask for a far view that is used to provide a relatively strong blur to a far view, and in addition, an intermediate-range view blur mask for an intermediate-range view that is used to provide a moderate blur to a view closer to and relatively far from the virtual camera than the far view, may be employed.

In the foregoing description, the size and location of the near view blur mask are set to a fixed value by way of example. Alternatively, the size and location of the near view blur mask may be changed, depending on at least one of the imaging direction of the virtual camera and the distance between the location of interest and the virtual camera like the far view blur mask. In addition, the size and location of the far view blur mask may have a fixed value. In addition, the far view blur mask may be disposed such that the center of a display image coincides with the center of the circular or elliptical shape. Alternatively, the far view blur mask may be disposed at a location offset vertically or horizontally relative to a display image. As an example, the far view blur mask may be disposed such that the center of the elliptical shape is located at a somewhat lower location in a display image.

In addition, in the foregoing description, the size and location of the far view blur mask are changed, depending on at least one of the imaging direction of the virtual camera and the distance between the location of interest and the virtual camera by way of example. Alternatively, the size and location of the far view blur mask may be set to a fixed value like the near view blur mask.

In addition, the above relation expressions between the parameters for setting the masks are only for illustrative purposes. Other relation expressions based on at least one of the imaging direction of the virtual camera and the distance between the location of interest and the virtual camera may be employed. For example, different relation expressions between the parameters may be set for different distances or different ranges in the imaging direction, and relation expressions represented by a linear function, quadratic, or polynomial function may be included In addition, in the above example, the masking process of decreasing the degree of blurring or avoiding blurring in a range of a screen in which blurring is performed, using the near view blur mask and the far view blur mask, is performed. However, in another example, a masking process of increasing the degree of blurring for at least a portion of a range of a screen in which blurring is performed, using a mask, may be performed.

In addition, in the above example, the parameters for setting the near view blur mask and the far view blur mask may be changed based on at least one of the imaging direction of the virtual camera and the distance between the location of interest and the virtual camera. Alternatively, the parameters for setting the near view blur mask and the far view blur mask may, of course, be changed based only one of the imaging direction of the virtual camera and the distance between the location of interest and the virtual camera. In that case, even if, when the imaging direction of the virtual camera is changed, depending on the user's operation, the location/direction of the virtual camera is changed such that the distance between the location of interest and the virtual camera is not changed, the above masking process may be performed, depending on a change in the imaging direction. In addition, even if, when the distance between the location of interest and the virtual camera is changed, depending on the user's operation, the location of the virtual camera is changed such that the imaging direction of the virtual camera is not changed, the above masking process may be performed, depending on a change in the distance.

Next, a specific example of the process executed in the game system 1 will be described with reference to FIG. 26. FIG. 26 is a diagram illustrating an example of a data area set in the DRAM 85 of the main body apparatus 2. It should be noted that the DRAM 85 also stores data used in other processes in addition to the data of FIG. 26, and those data will not be described in detail.

Various programs Pa that are executed in the game system 1 are stored in a program storage area of the DRAM 85. In the present example, the programs Pa include an application program (e.g., a game program) for performing information processing based on data obtained from the left controller 3 and/or the right controller 4, and the main body apparatus 2. Note that the programs Pa may be previously stored in the flash memory 84, may be obtained from a storage medium removably attached to the game system 1 (e.g., a predetermined type of storage medium attached to the slot 23) and then stored in the DRAM 85, or may be obtained from another apparatus via a network, such as the Internet, and then stored in the DRAM 85. The processor 81 executes the programs Pa stored in the DRAM 85.

Various kinds of data that are used in processes such as an information process that are executed in the game system 1 are stored in a data storage area of the DRAM 85. In the present example, the DRAM 85 stores operation data Da, player character data Db, virtual camera data Dc, captured image data Dd, blurred image data De, mask data Df, display image data Dg, profile data Dh, virtual space data Di, image data Dj, and the like.

The operation data Da is obtained, as appropriate, from each of the left controller 3 and/or the right controller 4 and the main body apparatus 2. As described above, the operation data obtained from each of the left controller 3 and/or the right controller 4 and the main body apparatus 2 includes information about an input from each input section (specifically, each button, an analog stick, or a touch panel) (specifically, information about an operation). In the present example, operation data is obtained from each of the left controller 3 and/or the right controller 4 and the main body apparatus 2. The obtained operation data is used to update the operation data Da as appropriate. Note that the operation data Da may be updated for each frame that is the cycle of a process executed in the game system 1, or may be updated each time operation data is obtained.

The player character data Db indicates the place, direction, and position of a player character PC disposed in the virtual space, the movement and state in the virtual space of the player character PC, and the like.

The virtual camera data Dc indicates the location, imaging direction, angle of view, and the like of a virtual camera disposed in the virtual space.

The captured image data Dd indicates a captured image (clear image) generated by imaging the inside of the range of view of the virtual camera with substantially all thereof in focus. The blurred image data De indicates a blurred image generated by imaging and blurring the inside of the range of view of the virtual camera.

The mask data Df indicates a near view blur mask and a far view blur mask set based on the state of the virtual camera.

The display image data Dg indicates a display image generated by mixing a captured image with a blurred image using a blend ratio for each pixel depending on the degree of blurring.

The profile data Dh indicates a blurring degree profile set based the imaging direction.

The virtual space data Di indicates the locations, directions, orientations, motions, and the like of virtual objects and characters disposed in the virtual space, and a field set in the virtual space.

The image data Dj is used to display, on a display screen (e.g., the display 12 of the main body apparatus 2), images (e.g., an image of a player character PC, an image of other characters, an image of virtual objects, an image of a field in the virtual space, and a background image).

Figure 27:
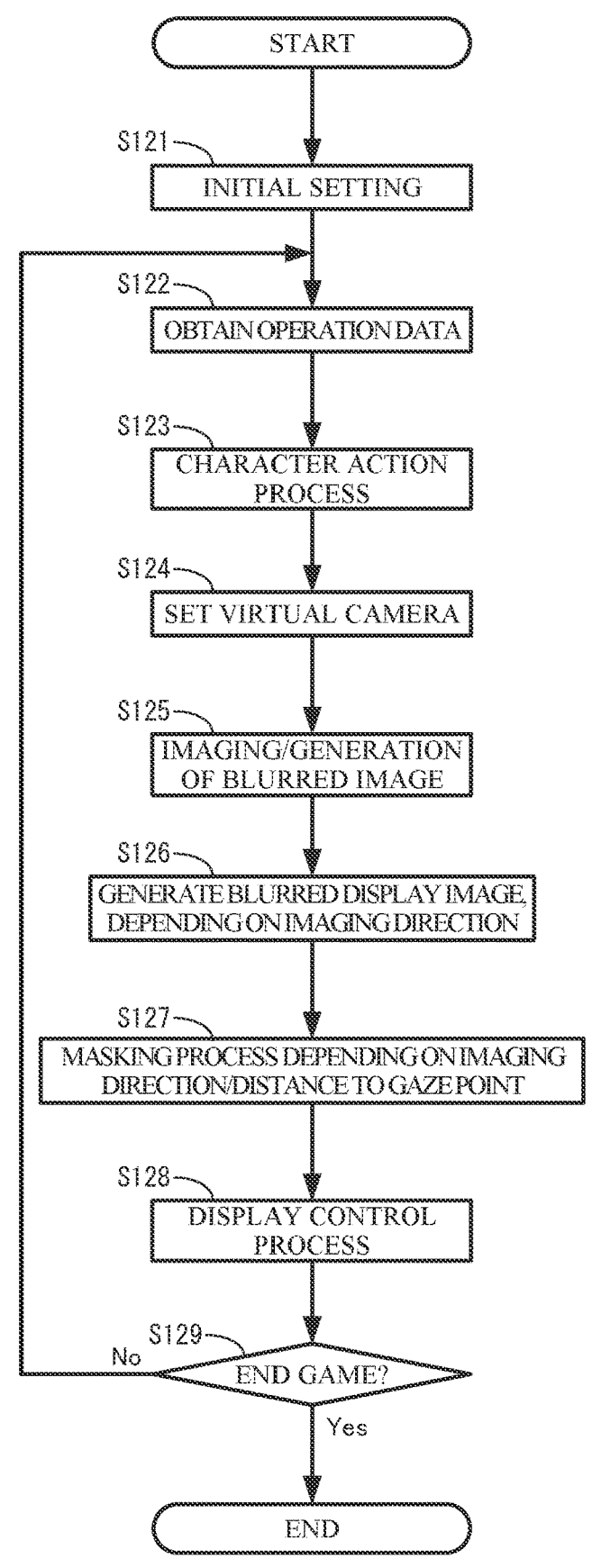
FIG. 27 is a flowchart illustrating a non-limiting example of a game process executed in a game system 1.

Next, a detailed example of a game process that is an example of an information process of the present example will be described with reference to FIG. 27. FIG. 27 is a flowchart illustrating an example of a game process executed in the game system 1. In the present example, a series of steps illustrated in FIG. 27 are executed by the processor 81 executing a predetermined application program (game program) included the programs Pa. The game process of FIG. 27 is started with any appropriate timing.

It should be noted that the steps in the flowchart of FIG. 27, which are merely illustrative, may be executed in a different order, or another step may be executed in addition to (or instead of) each step, if a similar effect is obtained. In the present example, it is assumed that the processor 81 executes each step of the flowchart. Alternatively, a portion of the steps of the flowchart may be executed by a processor or dedicated circuit other than the processor 81. In addition, a portion of the steps executed by the main body apparatus 2 may be executed by another information processing apparatus that can communicate with the main body apparatus 2 (e.g., a server that can communicate with the main body apparatus 2 via a network). Specifically, the steps of FIG. 27 may be executed by a plurality of information processing apparatuses including the main body apparatus 2 cooperating with each other.

In FIG. 27, the processor 81 performs initial setting for the game process (step S121), and proceeds to the next step. For example, in the initial setting, the processor 81 initializes parameters for performing steps described below, and updates each data. As an example, the processor 81 generates a virtual space in an initial state by disposing a plurality of virtual objects and characters on a field in the virtual space, based on the virtual space data Di. Thereafter, the processor 81 disposes a virtual camera having a predetermined orientation at a default location in the virtual space in the initial state. The virtual space is thus initially set.

Next, the processor 81 obtains operation data from the left controller 3, the right controller 4, and/or the main body apparatus 2, and updates the operation data Da (step S122), and proceeds to the next step.

Next, the processor 81 executes a character action process (step S123), and proceeds to the next step. For example, the processor 81 sets the player character PC's action based on the operation data Da4. As an example, the processor 81 sets the place, direction, position, action, state, and the like of the player character PC based on an operation input indicated by the operation data Da, virtual physical calculation in the virtual space, and the like, and updates the player character data Db. In addition, the processor 81 sets actions of other characters in the virtual space. As an example, the processor 81 sets the place, direction, position, action, state, and the like of each character, based on the progress of a set scene, an algorithm for automatically controlling the action of each character, a virtual physical calculation in the virtual space, the player character PC's action, and the like, and updates the virtual space data Di.

Next, the processor 81 sets the virtual camera (step S124), and proceeds to the next step. For example, the processor 81 sets the location and angle of view of the virtual camera in the virtual space, based on the operation data Da, sets the location and imaging direction of the virtual camera such that a location of interest set based on the location of the player character PC is the gaze point, and updates the virtual camera data Dc.

Next, the processor 81 generates a captured image and a blurred image of the range of view of the virtual camera (step S125), and proceeds to the next step. For example, the processor 81 updates the captured image data Dd using a captured image (clear image) generated by imaging the inside of the virtual camera with substantially all thereof in focus using the virtual camera corresponding to the virtual camera data Dc. In addition, the processor 81 updates the blurred image data De using a blurred image generated by imaging and blurring using the virtual camera.

Next, the processor 81 performs the image blurring process of blurring the captured image, depending on the imaging direction of the virtual camera (step S126), and proceeds to the next step. For example, the processor 81 sets a blurring degree profile corresponding to the imaging direction of the virtual camera, and updates the profile data Dh, and generates a display image by the image blurring process of combining the captured image with the blurred image for each pixel location, based on the blurring degree profile, and updates the display image data Dg. It should be noted that the details of the image blurring process are similar to those described with reference to FIGS. 8 to 18 and will not be described.

Next, the processor 81 performs the masking process, depending on the imaging direction of the virtual camera and/or the distance between the virtual camera and the gaze point (step S127), and proceeds to the next step. For example, the processor 81 sets a near view blur mask and a far view blur mask, depending on the imaging direction of the virtual camera and/or the distance between the virtual camera and the gaze point, and updates the mask data Df, and changes the degree of blurring for at least a portion of the display image indicated by the display image data Dg by performing the masking process on the display image using the near view blur mask and the far view blur mask, and updates the display image data Dg. It should be noted that the details of the masking process are similar to those described with reference to FIGS. 19 to 25 and will not be described.

Next, the processor 81 executes a display control process (step S128), and proceeds to the next step. For example, the processor 81 performs control to display the display image indicated by the display image data Dg on the display 12.

Next, the processor 81 determines whether or not to end the game process (step S129). The game process in step S129 is ended, for example, if a condition for ending the game process is satisfied, the user has performed an operation of ending the game process, or the like. If the processor

81 does not determine to end the game process, the processor 81 returns to and repeats step S122. If the processor 81 determines to end the game process, the processor 81 ends the process of the flowchart. Thereafter, steps S122 to S129 are repeatedly executed until the processor 81 determines to end the game process in step S129.

Thus, in the present example, an image blurred with the degree of blurring depending on the imaging direction of the virtual camera is displayed, resulting in an improvement in the visibility of the image. As an example, when a virtual space is imaged in an imaging direction of a virtual camera that allows the virtual camera to cover a relatively far and wide area, then if the degree of blurring is decreased for an area far from the virtual camera, the visibility of the far-view image can be improved. In addition, in the present example, the range of a screen in which blurring is performed can be changed by the masking process, depending on the state of the virtual camera, and therefore, the visibility of the image can be improved.

It should be noted that in the present example, the above masking process may not be performed. In that case, a display image that has been generated and stored in the display image data Dg in step S126 may be displayed on the display 12 without step S127 of FIG. 27. Even in that case, an image blurred with the degree of blurring depending on the imaging direction of the virtual camera can be displayed, and therefore, the effect of improving the visibility of the image can be obtained.

In addition, in the above example, an image of a virtual space in which a player character that is caused to perform an action according to the user's operation is displayed. In another embodiment, an image of a virtual space in which a player character is not disposed may be displayed. Even in a virtual space in which a player character is not disposed, a blurred image can be generated by performing the image blurring process and/or the masking process on an image in the range of view of a virtual camera with the focal point set in the vicinity of a predetermined location in the virtual space as the location of interest.

The game system 1 may be any suitable apparatus, including a handheld game apparatus, or any suitable handheld electronic apparatus (a personal digital assistant (PDA), mobile telephone, personal computer, camera, tablet computer, etc.), etc.

In the foregoing, the information processes (game processes) are performed in the game system 1. Alternatively, at least a portion of the process steps may be performed in another apparatus. For example, when the game system 1 can also communicate with another apparatus (e.g., a server, another information processing apparatus, another image display apparatus, another game apparatus, another mobile terminal, etc.), the process steps may be executed in cooperation with the second apparatus. By thus causing another apparatus to perform a portion of the process steps, a process similar to the above process can be performed. The above information process may be executed by a single processor or a plurality of cooperating processors included in an information processing system including at least one information processing apparatus. In the above example, the information processes can be performed by the processor 81 of the game system 1 executing predetermined programs. Alternatively, all or a portion of the above processes may be performed by a dedicated circuit included in the game system 1.

Here, according to the above variation, the present example can be implanted in a so-called cloud computing system form or distributed wide-area and local-area network system forms. For example, in a distributed local-area network system, the above process can be executed by cooperation between a stationary information processing apparatus (a stationary game apparatus) and a mobile information processing apparatus (handheld game apparatus). It should be noted that, in these system forms, each of the above steps may be performed by substantially any of the apparatuses, and the present example may be implemented by assigning the steps to the apparatuses in substantially any manner.

The order of steps, setting values, conditions for determination, etc., used in the above information process are merely illustrative, and of course, other order of steps, setting values, conditions for determination, etc., may be used to implement the present example.

The above programs may be supplied to the game system 1 not only through an external storage medium, such as an external memory, but also through a wired or wireless communication line. The program may be previously stored in a non-volatile storage device in the game system 1. Examples of an information storage medium storing the program include non-volatile memories, and in addition, CD-ROMs, DVDs, optical disc-like storage media similar thereto, and flexible disks, hard disks, magneto-optical disks, and magnetic tapes. The information storage medium storing the program may be a volatile memory storing the program. Such a storage medium may be said as a storage medium that can be read by a computer, etc. (computer-readable storage medium, etc.). For example, the above various functions can be provided by causing a computer, etc., to read and execute programs from these storage media.

While several example systems, methods, devices, and apparatuses have been described above in detail, the foregoing description is in all aspects illustrative and not restrictive. It should be understood that numerous other modifications and variations can be devised without departing from the spirit and scope of the appended claims. It is, therefore, intended that the scope of the present technology is limited only by the appended claims and equivalents thereof. It should be understood that those skilled in the art could carry out the literal and equivalent scope of the appended claims based on the description of the present example and common technical knowledge. It should be understood throughout the present specification that expression of a singular form includes the concept of its plurality unless otherwise mentioned. Specifically, articles or adjectives for a singular form (e.g., "a", "an", "the", etc., in English) include the concept of their plurality unless otherwise mentioned. It should also be understood that the terms as used herein have definitions typically used in the art unless otherwise mentioned. Thus, unless otherwise defined, all scientific and technical terms have the same meanings as those generally used by those skilled in the art to which the present example pertain. If there is any inconsistency or conflict, the present specification (including the definitions) shall prevail.

As described above, the present example is applicable as an information processing program, information processing apparatus, information processing system, information processing method, and the like that are capable of providing a display image with improved visibility.

What is claimed is:

1. A non-transitory computer-readable storage medium having stored therein an information processing program that when executed by a computer of an information processing apparatus, causes the computer to perform operations comprising:

generating a blurred image by blurring an image of a virtual space in a range of view from a virtual camera with a degree of blurring depending on a distance from the virtual camera; and performing a process of outputting the blurred image on a display screen, wherein in the generating the blurred image,
the blurred image is generated with the degree of blurring additionally depending on an imaging direction of the virtual camera, and
in a range in which the distance from the virtual camera is longer than a first distance, the degree of blurring is changed and increased with an increase in the distance from the virtual camera, and is changed and decreased for a location where the distance from the virtual camera is a second distance longer than the first distance, based on the imaging direction of the virtual camera.

2. The non-transitory computer-readable storage medium according to claim 1, wherein in the generating the blurred image, in a range in which the distance from the virtual camera is shorter than a first distance, the degree of blurring is changed and increased with a decrease in the distance from the virtual camera, and is changed and decreased for a location where the distance from the virtual camera is a third distance shorter than the first distance, based on the imaging direction of the virtual camera.

3. The non-transitory computer-readable storage medium according to claim 1, wherein in the generating the blurred image,
in a range in which the distance from the virtual camera is longer than a first distance, the degree of blurring is changed and increased with an increase in the distance from the virtual camera, and is changed and decreased for a location where the distance from the virtual camera is a second distance longer than the first distance, based on the imaging direction of the virtual camera, and
in a range in which the distance from the virtual camera is shorter than the first distance, the degree of blurring is changed and increased with a decrease in the distance from the virtual camera, and is changed and decreased for a location where the distance from the virtual camera is a third distance shorter than the first distance, based on the imaging direction of the virtual camera.

4. The non-transitory computer-readable storage medium according to claim 1, wherein in the generating the blurred image, the degree of blurring is changed and decreased for the second distance with a decrease in a difference between a direction in which a reference plane extends in the virtual space and the imaging direction.

5. The non-transitory computer-readable storage medium according to claim 2, wherein in the generating the blurred image, the degree of blurring is changed and decreased for the third distance with a decrease in a difference between a direction in which a reference plane extends in the virtual space and the imaging direction.

6. The non-transitory computer-readable storage medium according to claim 4, wherein the reference plane is set such that a game object disposed further in the virtual space is imaged when the imaging direction of the virtual camera is parallel to the reference plane than when the imaging direction of the virtual camera is perpendicular to the reference plane.

7. The non-transitory computer-readable storage medium according to claim 4, wherein the reference plane is set perpendicular to a downward direction of the virtual space.

8. The non-transitory computer-readable storage medium according to claim 4, wherein the information processing program further causes the computer to perform operations comprising:

when the imaging direction of the virtual camera is changed based on a user's first input, changing a distance between a gaze point of the virtual camera and the virtual camera, depending on the imaging direction.

9. The non-transitory computer-readable storage medium according to claim 8, wherein in the changing the distance, the distance between the gaze point and the virtual camera is decreased with a decrease in the difference between the direction in which the reference plane extends and the imaging direction.

10. The non-transitory computer-readable storage medium according to claim 8, wherein the information processing program further causes the computer to perform operations comprising: moving a player character disposed in the virtual space, based on the user's second input, and in the changing the distance, the virtual camera is controlled with the gaze point set at the player character.

11. The non-transitory computer-readable storage medium according to claim 1, wherein in the generating the blurred image, the blurred image is generated by blurring the image of the virtual space in the range of view from the virtual camera, depending on a distance between a location in the virtual space of each pixel of the image and the virtual camera.

12. An information processing apparatus, comprising:

a memory and a processor configured to cooperate to at least:

generate a blurred image by blurring an image of a virtual space in a range of view from a virtual camera with a degree of blurring depending on a distance from the virtual camera; and perform a process of outputting the blurred image on a display screen, wherein in the generating the blurred image, the blurred image is generated with the degree of blurring additionally depending on an imaging direction of the virtual camera, and in a range in which the distance from the virtual camera is longer than a first distance, the degree of blurring is changed and increased with an increase in the distance from the virtual camera, and is changed and decreased for a location where the distance from the virtual camera is a second distance longer than the first distance, based on the imaging direction of the virtual camera.

13. An information processing system, comprising:

a memory storing a program; and a processor configured to execute the program to at least:

generate a blurred image by blurring an image of a virtual space in a range of view from a virtual camera with a degree of blurring depending on a distance from the virtual camera; and perform a process of outputting the blurred image on a display screen, wherein in the generating the blurred image, the blurred image is generated with the degree of blurring additionally depending on an imaging direction of the virtual camera, and in a range in which the distance from the virtual camera is longer than a first distance, the degree of blurring is changed and increased with an increase in the distance from the virtual camera, and is changed and decreased for a location where the distance from the virtual camera is a second distance longer than the first distance, based on the imaging direction of the virtual camera.

14. An information processing method comprising:

generating a blurred image by blurring an image of a virtual space in a range of view from a virtual camera with a degree of blurring depending on a distance from the virtual camera; and performing a process of outputting the blurred image on a display screen, wherein in the generating the blurred image, the blurred image is generated with the degree of blurring additionally depending on an imaging direction of the virtual camera, and in a range in which the distance from the virtual camera is longer than a first distance, the degree of blurring is changed and increased with an increase in the distance from the virtual camera, and is changed and decreased for a location where the distance from the virtual camera is a second distance longer than the first distance, based on the imaging direction of the virtual camera.

15. The information processing system according to claim 13, wherein in the generating the blurred image, the degree of blurring is changed and decreased for the second distance with a decrease in a difference between a direction in which a reference plane extends in the virtual space and the imaging direction.

16. The information processing system according to claim 15, wherein the reference plane is set such that a game object disposed further in the virtual space is imaged when the imaging direction of the virtual camera is parallel to the reference plane than when the imaging direction of the virtual camera is perpendicular to the reference plane.

17. The information processing system according to claim 15, wherein the reference plane is set perpendicular to a downward direction of the virtual space.

18. The information processing system according to claim 15, wherein when the imaging direction of the virtual camera is changed based on a user's first input, a distance between a gaze point of the virtual camera and the virtual camera is changed, depending on the imaging direction.

19. The information processing system according to claim 18, wherein in the changing the distance, the distance between the gaze point and the virtual camera is decreased with a decrease in the difference between the direction in which the reference plane extends and the imaging direction.

20. The information processing system according to claim 18, wherein a player character disposed in the virtual space is moved, based on the user's second input, and in the changing the distance, the virtual camera is controlled with the gaze point set at the player character.

* * * * *